(12) United States Patent
Knowles et al.

(10) Patent No.: US 8,326,210 B2
(45) Date of Patent: Dec. 4, 2012

(54) PARTICIPANT RESPONSE SYSTEM AND METHOD

(75) Inventors: Anthony Knowles, Hampshire (GB); Christopher Davies, Hampshire (GB); Andrew Cornall, Hampshire (GB)

(73) Assignee: IML Limited, Liphook (GB)

( * ) Notice: Subject to any disclaimer, the term of this patent is extended or adjusted under 35 U.S.C. 154(b) by 0 days.

(21) Appl. No.: 10/238,683

(22) Filed: Sep. 11, 2002

(65) Prior Publication Data

US 2004/0033478 A1    Feb. 19, 2004

(30) Foreign Application Priority Data

Aug. 15, 2002    (GB) .................................. 0219055.1

(51) Int. Cl.
*G09B 3/00*   (2006.01)
*G09B 7/00*   (2006.01)
*H04M 1/00*   (2006.01)

(52) U.S. Cl. ...... 434/350; 434/336; 434/362; 455/569.1

(58) Field of Classification Search ............... 434/350, 434/362, 336
See application file for complete search history.

(56) References Cited

U.S. PATENT DOCUMENTS

| | | | |
|---|---|---|---|
| 3,245,157 A | 4/1966 | Laviana et al. |
| 4,290,141 A | 9/1981 | Anderson et al. |
| 4,334,319 A | 6/1982 | Gurry |
| 4,347,604 A | 8/1982 | Saito et al. |
| 4,354,252 A | 10/1982 | Lamb et al. |
| 4,365,267 A | 12/1982 | Tsuda |
| 4,367,485 A | 1/1983 | Hemmie |
| 4,377,870 A | 3/1983 | Anderson et al. |
| 4,385,314 A | 5/1983 | Yashiro et al. |
| 4,392,132 A | 7/1983 | Derks |
| 4,415,065 A | 11/1983 | Sandstedt |
| 4,493,655 A | 1/1985 | Groff |
| 4,584,602 A | 4/1986 | Nakagawa |
| 4,591,906 A | 5/1986 | Morales-Garza et al. |
| 4,639,914 A | 1/1987 | Winters |
| 4,663,744 A | 5/1987 | Russell et al. |
| 4,689,619 A | 8/1987 | O'Brien, Jr. |
| 4,789,983 A | 12/1988 | Acampora et al. |
| 4,820,167 A | 4/1989 | Nobles et al. |
| 4,882,681 A | 11/1989 | Brotz |
| 4,910,794 A | 3/1990 | Mahany |
| 4,918,437 A | 4/1990 | Jasinski et al. |
| 4,921,464 A | 5/1990 | Ito et al. |
| 4,926,375 A | 5/1990 | Mercer et al. |
| 4,928,099 A | 5/1990 | Drake |
| 4,937,586 A | 6/1990 | Stevens et al. |
| 5,001,755 A | 3/1991 | Skret |
| 5,068,787 A | 11/1991 | Pipella et al. |
| 5,093,786 A | 3/1992 | Derks |

(Continued)

FOREIGN PATENT DOCUMENTS

DE    195 08 017 A    9/1996

(Continued)

*Primary Examiner* — Kesha Y. Frisby
(74) *Attorney, Agent, or Firm* — Dickstein Shapiro LLP

(57) ABSTRACT

A participant response system comprises a plurality of handsets for allowing a participant of an event to input a response. Each handset comprises a wireless handset having a keyboard for allowing a user to input a response. The handsets are configurable either as a participant response handset to allow a participant to enter a response, or as a base station. The handset also includes audio capability to allow participants to receive and input audio.

12 Claims, 24 Drawing Sheets

U.S. PATENT DOCUMENTS

| | | | |
|---|---|---|---|
| 5,206,721 A | 4/1993 | Ashida et al. | |
| 5,226,177 A | 7/1993 | Nickerson | |
| 5,273,437 A | 12/1993 | Caldwell et al. | |
| 5,297,144 A | 3/1994 | Gilbert et al. | |
| 5,303,042 A | 4/1994 | Lewis et al. | |
| 5,329,620 A | 7/1994 | Alford et al. | |
| 5,357,609 A | 10/1994 | Sellers et al. | |
| 5,371,858 A | 12/1994 | Miller et al. | |
| 5,379,213 A | 1/1995 | Derks | |
| 5,587,560 A | 12/1996 | Crooks et al. | |
| RE35,449 E | 2/1997 | Derks | |
| 5,606,344 A * | 2/1997 | Blaskey et al. | 715/500.1 |
| 5,724,357 A | 3/1998 | Derks | |
| 5,727,950 A * | 3/1998 | Cook et al. | 434/350 |
| 5,768,345 A * | 6/1998 | Takebe et al. | 455/464 |
| 5,860,023 A | 1/1999 | Tognazzini | |
| 5,870,214 A | 2/1999 | Knowles | |
| 6,014,406 A * | 1/2000 | Shida et al. | 375/133 |
| 6,021,119 A | 2/2000 | Derks et al. | |
| 6,086,381 A * | 7/2000 | Downs et al. | 434/322 |
| 6,148,174 A * | 11/2000 | Remschel | 434/350 |
| 6,155,840 A * | 12/2000 | Sallette | 434/323 |
| 6,178,321 B1 * | 1/2001 | Auffray et al. | 455/403 |
| 6,195,687 B1 * | 2/2001 | Greaves et al. | 709/208 |
| 6,275,258 B1 | 8/2001 | Chim | |
| 6,366,572 B1 * | 4/2002 | Esterberg et al. | 370/343 |
| 6,628,918 B2 * | 9/2003 | Roschelle et al. | 434/350 |
| 6,700,956 B2 * | 3/2004 | Chang et al. | 379/93.09 |
| 6,728,546 B1 * | 4/2004 | Peterson et al. | 455/462 |
| 6,885,844 B2 * | 4/2005 | Roschelle et al. | 434/350 |
| 7,103,380 B1 * | 9/2006 | Ditzik | 455/556.2 |
| 7,274,934 B2 * | 9/2007 | Arazi et al. | 455/436 |
| 2001/0014603 A1 | 8/2001 | Bucknell et al. | |
| 2001/0034599 A1 | 10/2001 | Kage et al. | |
| 2002/0018448 A1 | 2/2002 | Amis et al. | |
| 2005/0048954 A1 | 3/2005 | Gortz et al. | |

FOREIGN PATENT DOCUMENTS

| | | |
|---|---|---|
| DE | 196 071 13 A | 8/1997 |
| EP | 0 565 230 A2 | 10/1993 |
| EP | 0690601 | 1/1996 |
| EP | 0 923 216 A | 6/1999 |
| EP | 0-984-651 | 3/2000 |
| EP | 0 984 651 A2 | 3/2000 |
| GB | 2268370 | 1/1994 |
| GB | 2 322 047 A | 8/1998 |
| JP | 2001 119487 | 4/2001 |
| JP | 2002 142024 | 5/2002 |
| WO | WO 95/07578 | 3/1995 |
| WO | WO 99/03253 | 1/1999 |
| WO | WO 01/82643 | 11/2001 |
| WO | WO 03/047172 | 6/2003 |
| WO | WO 03/049065 A1 * | 6/2003 |

* cited by examiner

| SLOT | TYPE | DESCRIPTION |
|---|---|---|
| 0 | Info Setup | |
| 2 | Info | Basestation transmits on every frame network information. |
| 3 | Blank / Audio Setup | |
| 4 | Blank / Audio Setup / Audio | Audio Transmit or receive channels |
| 5 | Blank / Audio Setup / Audio | Audio Transmit or receive channels |
| 6 | Blank / Audio Setup / Audio | Audio Transmit or receive channels |
| 7 | Blank / Audio Setup / Audio | Audio Transmit or receive channels |
| 8 | Blank / Audio | Audio Transmit or receive channels |
| 9 | Message Setup | |
| 10 | Message | |
| 11 | Message Setup | |
| 12 | Message | |
| 13 | Message Setup | |
| 14 | Message | |
| 15 | Message Setup | |
| 16 | Message | |
| 17 | Command Setup | |
| 18 | Command | |
| 19 | Blank | |

Fig 15

| SLOT | TYPE | DESCRIPTION |
|---|---|---|
| 0 | Info Setup | |
| 2 | Info | |
| 3 | Blank / Audio Setup | |
| 4 | Blank / Audio Setup / Audio | |
| 5 | Blank / Audio Setup / Audio | |
| 6 | Blank / Audio Setup / Audio | |
| 7 | Blank / Audio Setup / Audio | |
| 8 | Blank / Audio Setup / Audio | |
| 9 | Blank / Audio Setup / Audio | |
| 10 | Blank / Audio Setup / Audio | |
| 11 | Blank / Audio Setup / Audio | |
| 12 | Blank / Audio | |
| 13 | Message Setup | |
| 14 | Message | |
| 15 | Message Setup | |
| 16 | Message | |
| 17 | Command Setup | |
| 18 | Command | |
| 19 | Blank | |

Fig 16

| FIELD | BYTES | DESCRIPTION |
|---|---|---|
| Base | 2 | Base Number of Basestation |
| Time | 4 | Network Time |
| Slot Structure | 1 | Current Slot structure being used |
| Command Present | 1 | True if a command is present in the frame |
| Command Number | 1 | Current Command Number |
| Max R | 1 | Retry Parameters for Messages |
| Acknowlegements | 16 | Up to 4 Acknowledgement UIDs |

Fig 17

PARTICIPANT RESPONSE SYSTEM AND METHOD

FIELD OF THE INVENTION

The present invention generally relates to a response system and method provided to enable participants of an event to input a response to the event using handsets.

BACKGROUND OF THE INVENTION

Systems for enabling participants of an event or an audience to enter responses are well known in the art. Such systems have wide applicability. For example, in a conference, conference participants can be provided with units or handsets which enable conference participants to fully participate by responding to questions individually, or by voting on motions raised during the conference. These systems also have applicability for any type of voting application such as audience voting for entertainment programmes. Such systems are also applicable in the field of education. Students can be provided with handsets for entering answers to questions. These systems enable immediate feedback to a presenter in a conference, a teacher, to entertainment programme producers, or to event organizers. Response systems can be generally divided into two categories: a hardwired system and a wireless system. A hardwired system is for example disclosed in U.S. Pat. Nos. 5,303,042 and 5,357,609. However, hardwired systems suffer from the disadvantage of requiring cables to connect each of the handsets to be used by participants. Thus these systems are less transportable and flexible. Wireless participant response systems can use any type of wireless communication system. For example, U.S. Pat. No. 5,870,214 discloses a system using infra-red as the transmission medium. This system is advantageous in that it is less prone to interference. The system does however require a line of sight between transmitters and receivers. Other wireless systems use radio frequency transmissions between transmitters and receivers. Such a system is disclosed in U.S. Pat. No. 5,273,437. This document discloses an audience participation system which uses the spread spectrum communication protocol for communication between keypads and a base station. Keypads are coded with characteristics to identify users to enable audience responses to be individually identified. This coding can be achieved by providing a bar code scanner to scan a conference badge worn by the user. To enable full participation the keypads are also provided with an audio capability enabling voice input to be transmitted over the wireless system.

Another RF wireless system is disclosed in U.S. Pat. No. 5,724,357 in which voice responses and keypad responses can be transmitted from handsets to a system controller. In this system code can be downloaded to configure handsets. However, a separate system controller is required.

SUMMARY OF THE INVENTION

It is an object of one aspect of the present invention to provide a more flexible and configurable participant response system.

In accordance with a first aspect, the present invention provides a handset for use in a response system which allows a participant of an event to enter a response to the event. The handset includes the ability to communicate by wireless with other handsets. The handsets are configurable as a participant handset to allow a participant to input a response and as a base station for communicating with participant handsets.

Thus, in accordance with this aspect of the present invention, no separate base station is required. Flexibility is provided by using the same handset as the participant handset and as the base station.

In one embodiment the base station can include the functionality of a master handset. In such an embodiment the handsets configured as participant handsets and a master handset (with or without a handset configured as a separate base station) provide a complete participant response system. The master handset receives and processes responses and can be provided with a display to display the results of the processing of the responses. Thus this embodiment of the present invention provides a highly flexible system which enables a complete participant response system to be provided by the same units, i.e. handsets, suitably configured to perform different roles within the participant response system.

In one embodiment of the present invention handsets are configured as participant handsets and at least one base station. The or each base station is connectable to a computer to act as the controller of the participant response system. A computer can thus receive and process responses and provide a suitable display of the processed responses. In this embodiment, when a handset is connected to the computer, it can automatically configure itself to act as a base station. The connection to the computer can either be physical, e.g. a cable, or a wireless connection. In one embodiment of the present invention the connection is provided by a cable and the handset detects signals from the computer on the cable in order to determine whether to automatically configure itself as a base station.

In one embodiment, when a handset is acting as a base station without master handset capabilities, received responses are passed over the connection to the computer. Also in this embodiment, the computer can send configuration control instructions to the participants' handsets via the base station.

In other embodiment of the present invention when the base station acts as a master handset, responses received from the participants' handsets are processed within the base station and can be displayed on the base station handset. Also, the master handset function can generate configuration control instructions which are transmitted to the participants' handsets in order to modify the configuration of the handsets.

Thus in accordance with this aspect of the present invention, a flexible participant response system can be provided simply by providing a plurality of configurable handsets, a computer connection cable, and suitable software for configuring a general-purpose computer to act as a controller. Such a system enables a participant response system to be set up either using a computer as a controller, or using a handset as a master handset to control the participant response system.

In another aspect of the present invention, the functionality of handsets for use in a participant response system can be configured dependent upon the identity of the participant using the handset, or a group to which the participant belongs. In this system, when a participant receives the handset, before they can use it they must enter information identifying the participant or a group to which the participant belongs. This entered information is transmitted over the wireless link to a central unit, e.g. to a computer via the base station, or to a master handset. At the central unit, handset configuration parameters are determined on the basis of the entered information and these configuration parameters are transmitted back to the handset and used to configure the handset.

Thus in accordance with this aspect of the present invention, configuration instances can be set up for individual users or groups of users based on instance information stored centrally. This provides a flexible configuration system which enables information on the configuration of the handsets to be stored centrally.

In one embodiment the entered information includes information identifying the level of functionality of the handset available to the participant. Alternatively, in another embodiment, the central unit stores functionality information linking the level of functionality of the handset with the entered information and the handset configuration parameters are determined using not only the entered information but also the functionality information. This latter embodiment enables sets of functionality information to be held centrally and modified centrally so as to keep central control of the configuration of handsets.

In one embodiment the handsets can be configured to allow communications between a group of participants without interfering with communications between participants of another group. This enables effective sub-division of the responses so that groups of individuals can provide responses to different questions or events, or responses to the same question or events but identified as belonging to different groups of participants.

Another aspect of the present invention provides a participant response system and method in which a participant is provided with a handset enabling them to enter information identifying the location of the participant. The information is sent by wireless to a central unit for processing information identifying the location of participants.

In accordance with this aspect of the present invention, a flexible participant response system is provided enabling participants to choose their location, e.g. allowing a participant to choose their seat during a conference, lecture or seminar. The seat number can then be entered in the handset so that this is known centrally.

In one embodiment of the present invention, at the central unit the position information is processed to generate data enabling a map of the event to be generated showing locations of the participants. When information is stored linking the identity of the participants and the handsets, this can be stored together with the position information, to provide richer information on the responses. For example, during a seminar or conference, the map can illustrate where response types form a pattern, e.g. indicating that participants in a region cannot hear or see the presentation properly, or indicating the voting patterns of different politicians in a council chamber.

In one embodiment of the present invention, the handsets are provided with the capability for audio input and audio transmission to allow other participants to hear the participants speak. The central unit in this embodiment can include camera control means for outputting information on the location of the speaking participant to a camera system to enable the camera system to automatically direct a camera on the speaking participant. In this way, when the participant speaks, the picture taken by the camera can be shown a screen to enable the audience not only to hear the participant but also see the participant provide their spoken contribution.

In a further embodiment of the present invention, a response system is provided for allowing a participant to audibly respond during an event. Participants provided with wireless handsets each including audio input means and audio transmission means for transmitting the audio for output to other participants of the event. Further, the wireless handsets include position input means to allow a participant to input information identifying the location of the participant. The information identifying the location of the participants is processed centrally and used to control a camera system to automatically direct a camera on the speaking participant.

Yet another aspect of the present invention provides a participant response system allowing a participant of an event to input a response, in which there are provided a plurality of independent communicating groups. Each independent communicating group comprises a plurality of wireless handsets. Each handset stores a group identity identifying a group to which the handset belongs. Input means allows a participant to input a response and this is transmitted to a base station. Each group also comprises at least one base station for communicating with the handsets in the group. Each base station stores a group identity identifying a group to which the base station belongs. Responses from the handsets are received by a wireless receiving means. Each handset is configured to set up the group identity of the handset dependent upon the group identity of a base station of the group. Thus in this way the handsets of the group and a base station within the group communicate independently of other groups by comparison of the identity stored for the handsets and the base station.

This use of independent communicating groups enables an event to be sub-divided so that participants can attend sub-events and respond to sub-events. Alternatively, participants can respond to the same event but the responses can be kept separate for separate processing.

In one embodiment each base station comprises a handset configured to act as a base station and each handset is configurable as a handset for use by a participant or as a base station. Thus in this embodiment a flexible participant response system is provided.

In a preferred embodiment the response system includes a response processor for processing responses from participants. The response processor is connected in use to each base station to receive the responses.

A further aspect of the present invention provides a participant response system and method in which a portable wireless handset is controlled to periodically communicate with a remote central controller to determine communication capability.

Thus in accordance with this aspect of the present invention, by continually periodically providing communication between the handset and the central controller, the system is able to monitor communication failures. This is particularly important in a voting system such as a voting system used during a company board meeting or company shareholders meeting where it is imperative to ensure that votes entered by participants were registered. If the communication monitoring indicates that communication was lost between a handset and the central controller at the point of a vote, and no vote was registered from the participant, this can provide information which can be used to determine whether the vote should be retaken. More importantly, it can also be used as a legal test to confirm that all handsets were in communication at the point of voting and thus if no vote was input by a participant, this must have been the decision of the participant and thus the decision is recorded accordingly.

In one embodiment, when a handset is unable to communicate with a central controller, the handset can record information. Such information can include, for example, battery status, signal strength, etc. This information can be uploaded to the central controller at some time after communication is re-established.

In another embodiment of the present invention, the central controller can operate to store information regarding communications with handsets. Thus this information can identify when no communications are received from a handset.

In this aspect of the present invention, a handset can act as a base station and store communication information or merely pass communication information on up to a master handset or a computer. Alternatively, the base station can act as the master handset and can store communication information and retrieve communication information from the participant handsets.

Another aspect of the present invention provides a participant response system for allowing a participant of an event to input a response. The system comprises a plurality of portable handsets and a recharging rack for receiving a plurality of portable handsets. Each portable handset comprises a rechargeable battery, recharging contacts for recharging the battery, a keypad for entry of a response by a participant, and a wireless module for transmission of the response to a remote receiver. The charging rack comprises a plurality of slots, each slot for receiving a portable handset and including resilient holding means for holding a portable handset and electrical contact means for electrically contacting the charging contacts on a portable handset. The charging rack includes power supply means for supplying charging power to the electrical contact means for each slot.

Thus in accordance with this embodiment of the present invention, a participant response system is provided which provides a simple way by which portable handsets can be recharged. The recharging rack includes resilient holding means which holds the portable handset so as to not require or rely upon gravity.

In a preferred embodiment the electrical contact means comprise magnetic contacts for maintaining electrical contact between the contact means and the recharging contacts on the portable handsets by magnetic attraction. The magnetic contacts ensure good electrical contact when the handset is placed in the slot and provide a reassuring positive contact to ensure proper recharging of the battery in the handset.

In one embodiment of the present invention the power supply means is adapted to cyclically apply power to each of the electrical contact means so as to cyclically charge portable handsets held in the recharging rack. This embodiment of the present invention has the advantage of charging the batteries in the handsets in the most efficient manner, i.e. by providing period power inputs, and enables the distribution of power to the handsets. By cyclically applying power to the handsets rather than supplying power to all handsets, a reduced power supply is required in the recharging rack. Thus the period application of power to the batteries by cycling the applied power across many batteries provides for efficient and low power charging of the batteries.

In one embodiment the recharging rack is modular and can be modularly attached to other recharging racks so as to connect the power supply means. Thus in this way where there are more participants in an event and thus the system requires more handsets, the participant response system can use more than one rechargeable rack modularly connected together. This enables for simple expansion of the system to meet demand.

A further aspect of the present invention provides a translation system and method for translation during event participation by event participants which uses a single communication channel for each of a plurality of languages. Translators are provided with units to enable them to translate between languages by receiving and transmitting on different channels. Participants are provided with units to enable them to listen to a channel in a language and speak in the same language over the same channel. When a participant is permitted to speak, a control system controls at least one translator's unit to switch channels to receive the language spoken by the participant to enable them to listen and translate so that the translation is transmitted into a second language on a second language channel.

In a preferred embodiment, a plurality of participants' headsets are provided. Each headset comprises an audio input and an audio output for use by a participant, a participant's handset wireless module for wireless communication, and a controller for controlling the participant's handset wireless module to transmit and receive audio for output and input using a communication channel designated for a language spoken by the participant. The system also comprises at least one translator's handset for use by a translator. Each translator's handset comprises an audio input for the input of audio in one language, an audio output for the output of audio in another language, a translator's handset wireless module for wireless communication, and a controller for controller the translator's handset wireless module to receive and transmit audio in a first language on a first communication channel and to receive and transmit audio in a second language on a second communication channel. The system also includes a control system for controlling the wireless communication of audio between the participants' handsets and at least one translator's headset. The control system is adapted to control the controller of a first said participant's handset to allow a participant to speak by controlling the participant's handset wireless module to transmit audio in a first language spoken by the participant over a first communication channel designated for the first language, to control said controller of a said translator's handset to allow a translator to listen to the audio in the first language and to input audio in the second language by controlling the translator's handset wireless module to receive audio in the first language using the first communication channel and to transmit audio in the second language using the second communication channel, and to control to said controller of a second said participant's handset to allow a participant to listen by controlling the participant's handset wireless module to receive audio in the second language spoken by the participant over the second communication channel.

Thus in accordance with this aspect of the present invention a simple system is provided for providing simultaneous translations using handsets provided to participants of an event. Translators automatically receive at an output the spoken audio that they are to translate. If a translator translates between a first and second language or in reverse between the second and the first language, the output to the translator can be switched either between the first or second language to enable the translator to translate to the second or first language respectively. The system is under the control of a central control system. The presenter or lecturer can use a handset for speaking in a first language. Participants whose language is a second language can receive the translation in the second language using a handset. If a participant wishes to speak and their spoken language is, for example, the second language, the presenter or lecturer can use the control system to allow them to speak. The communication channel for the second language for the participant's handset is automatically switched from receive to transmit mode and the associated translator's handset is also switched automatically to receive the second language and to allow the translator to translate to the first language for output.

Yet a further aspect of the present invention provides a handset for use in a participant response system to allow participants of an event to input a response. The handset includes input means for inputting a response, a wireless module for transmitting the response to a remote response receiver, an audio input device for allowing a participant to input speech, an audio output device for allowing the participant to listen to receive speech, and an audio controller for controlling the wireless module to transmit and receive audio to and from a group of at least one other handset to allow voice communication between participants.

Thus in accordance with this aspect of the present invention, the handset can be configured to provide an intercom function between members of a group of participants of an event.

According to a further aspect, the present invention provides a participant response system for use in a participant response system to allow participants of an event to provide a response which comprises a plurality of wireless handsets for use by participants for inputting a response, and a rack for holding the wireless handsets, in which the handsets are adapted to disable communications when held in said the, and to automatically enable communications when removed from the rack.

This aspect of the present invention provides for the convenient control of the handsets en mass. Handsets are automatically enabled for communication when they are removed from the rack. This avoids the need for a participant to have to turn on the handset before use.

In one embodiment of this aspect of the present invention, the handsets are adapted to turn off if they are unable to establish communications after automatically enabling communications. This feature enables all of the handsets to be turned off automatically by removing them from the rack and not providing for communications e.g. turning off the base station.

In one embodiment of this aspect of the present invention, the rack includes a charging system for electrically charging the handsets held in the rack, wherein the handsets are adapted to automatically enable communications when no electrical charging is detected. Thus this embodiment of the present invention enables the handsets to be turned off automatically either when they are withdrawn from the rack or en mass by turning off the charging system, assuming that there is no communication possible e.g. with the base station.

One aspect of the present invention provides a participant response system for use in a participant response system to allow participants of an event to provide a response which comprises a plurality of wireless handsets for use by participants for inputting a response, and a rack for holding said wireless handsets, wherein the rack includes handset control means for switching off the handsets in the rack to disable communications.

Thus in accordance with this aspect a simple en mass control of the handsets is provided for. The handset control means can comprise and electrical signalling arrangement for signalling to the handsets to switch off.

In one embodiment of this aspect of the present invention the handsets are adapted to switch on when removed from the rack to enable communications. This avoids the need for participant to remember to switch on the handsets.

In one embodiment of this aspect of the present invention the handsets include rechargeable batteries, and the handset control means comprises an electrical charging system for recharging the handsets, the electrical charging system is switchable on or off, and the handsets are adapted to switch off when the charging system is switched off. Thus in this embodiment the charging system acts as the control system.

In one embodiment of this aspect of the present invention the handsets are adapted to switch on to enable communications when no charging is detected from the charging system, and to switch off if they are unable to establish communications. This enables handsets to automatically switch on to try to connect when they are removed from the rack and when the rack is switched off. If no communication is possible, e.g.. no base station is detected, the handsets will automatically turn off. Thus in this way a simple method of automatically switching of the handsets is provided.

Although various aspects of the present invention have been described separately hereinabove, any of the aspects of the present invention can be used in conjunction with any other aspect of the present invention to provide an improved system and method.

BRIEF DESCRIPTION OF THE DRAWINGS

FIG. 15 is a table illustrating the content of the slot types in a frame in accordance with a first embodiment of the present invention;

FIG. 16 is a table illustrating the content of the slot types in accordance with a second embodiment of the present invention;

FIG. 17 is a table illustrating the content of the info slot in accordance with an embodiment of the present invention;

DESCRIPTION OF EXEMPLARY EMBODIMENTS

Figure 1A:
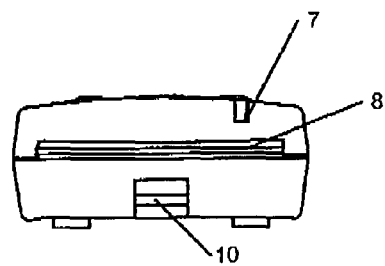
FIG. 1a is a top end view of a handset in accordance with an embodiment of the present invention.
Figure 1B:
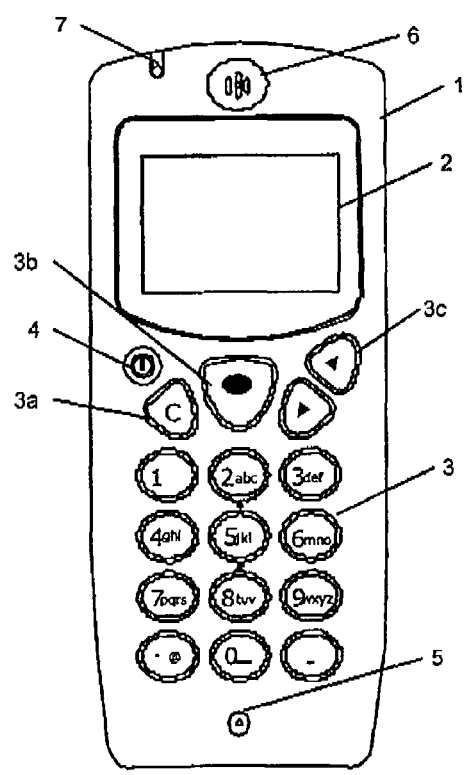
FIG. 1b is a front elevation of a handset in accordance with an embodiment of the present invention.
Figure 1C:
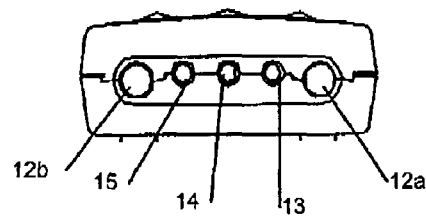
FIG. 1c is a bottom end view of a handset in accordance with an embodiment of the present invention.

A handset for use in a participant response system in accordance with an embodiment of the present invention will now be described with reference to FIGS. 1*a*, 1*b*, 1*c* and 2.

The handset 1 includes a liquid crystal display 2 for displaying information to a participant of an event such as a conference and for displaying an input response such as a number indicating a vote or answer to a question posed during the event. The liquid crystal display is a blue on green backlit dot matrix LCD with 97×32 pixels resolution. This enables a flexible graphical display to be configured for the display of information to the participant. The LED display 2 can display information regarding the status of the handset 1. For example a battery icon can display segments indicating the amount of battery remaining. An aerial icon can use bars to indicate the signal strength or the signal received from a base station. A clock icon can display the time which comprises the system time which follows the time of a computer acting as the system controller, or the time of a master handset.

A front face of the handset 1 is also provided with a keyboard 3 of a conventional layout such as that provided on a mobile telephone. Alphanumeric keys are arranged in a conventional rectangular arrangement. A cancel key 3*a* is provided and a soft key 3*b* is provided which can be programmably configured for providing a programmable input. Additionally, up and down arrow keys 3*c* are provided. Further, a power on/off button 4 is provided for switching the handset 1 on and off.

Additionally on the front face a microphone 5 is provided at a lower end of the front face and a loudspeaker 6 is provided at an upper end of the front face in a conventional mobile telephone configuration to enable the unit to be used for speech communication. On a top end of the handset 1 there is provided an LED indicator 7 which can indicate the status of the handset 1. The indicator flashes green to show that it is connected to a base station, orange to show that a signal level is low and red to show that it is trying to connect to the base station. When the handset 1 is being charged in the charging rack, as will be described in more detail hereinafter, the LED shows each handset's progress in the charging cycle. Red indicates low charge, orange indicates from low charge to nearly complete, and green indicates charging is completed. The LED 7 blinks when it is being charged during the charging cycle.

Figure 2:
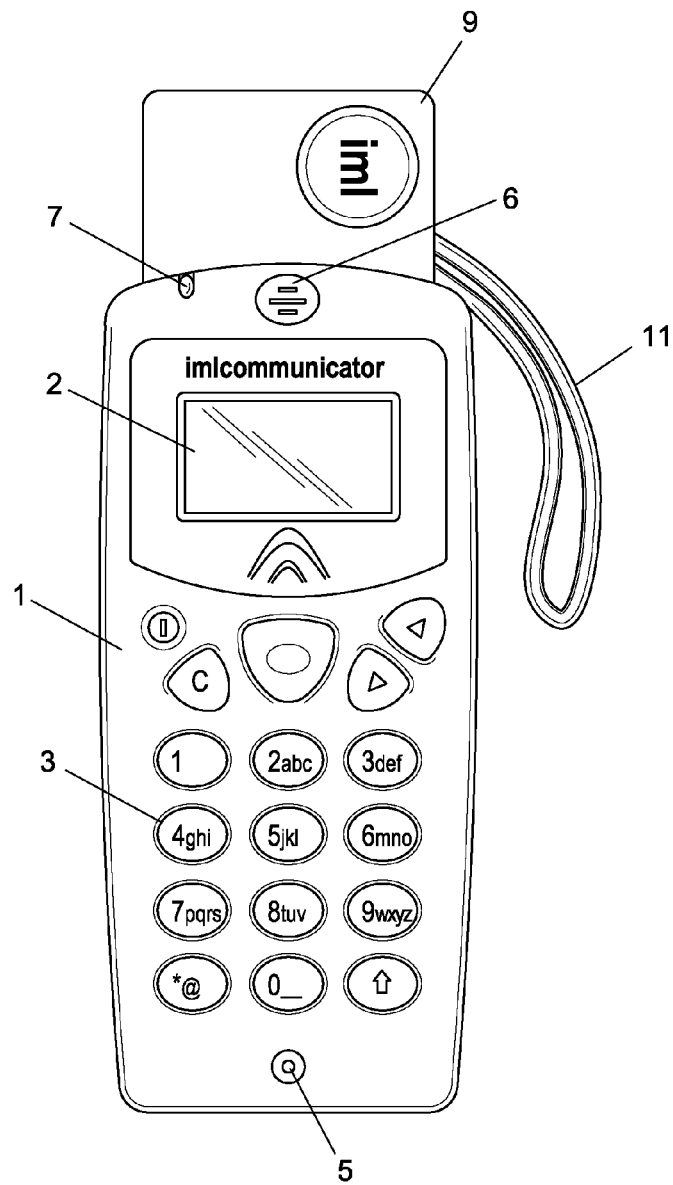
FIG. 2 is an illustration of a handset with a smart card inserted in accordance with an embodiment of the present invention.

At the top end of the handset 1 there is provided a wrist strap bar 10 to which a wrist strap 11 can be connected. Also in the top end of the handset 1 there is provided a smart card slot 8 for receipt of a smart card 9 as shown in FIG. 2. The smart card 9 can carry information for configuring the handset 1. A configuration can take the form of setting the mode of operation of the handset 1 or simply for entering parameters for use during the operation of the handset 1. The smart card can even be used to completely reprogram the handset 1 by providing computer code. Thus the smart card acts as one means of programming or configuring the handset 1.

At a bottom end of the handset 1 there are provided 2 recharging contacts 12*a* and 12*b*. These metallic contacts are made of magnetically attractive material so that the magnetic contacts in the charging rack will be attracted to and contact the recharging contacts 12*a* and 12*b*.

Also, the bottom end of the handset 1 is provided with 3 sockets: a data socket for connecting the handset 1 using the RS232C communication protocol to a computer, a microphone socket 14 for the connection of an external microphone and a headphone socket 15 for the connection of an external loudspeaker or headphones.

The structure of the recharging rack of the participant response system for recharging the handsets will now be described with reference to FIGS. 3 and 4.

Figure 3:
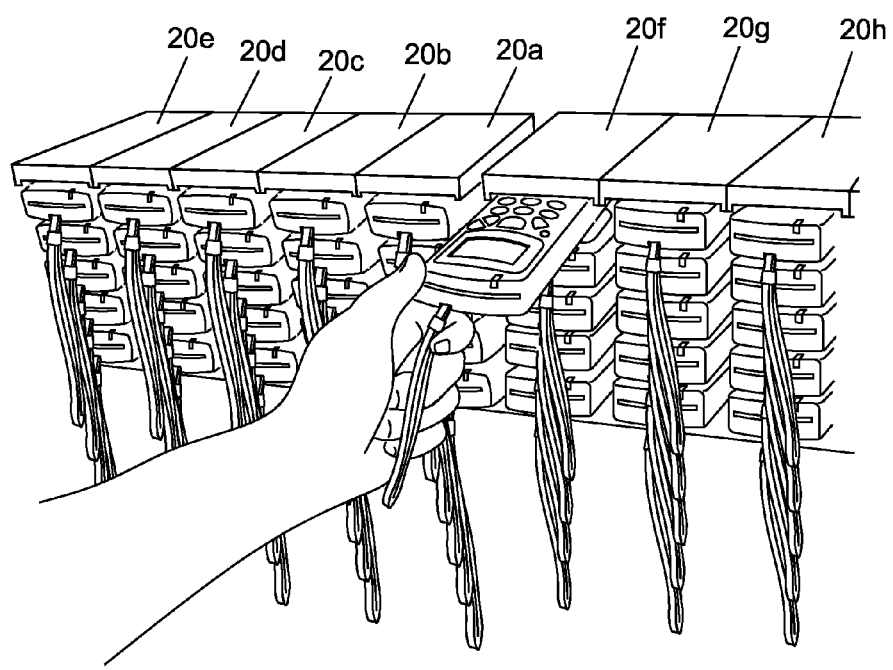
FIG. 3 is a diagram of a bank of recharging racks containing handsets in accordance with an embodiment of the present invention.

FIG. 3 illustrates two banks of recharging racks containing handsets 1. Individual charging racks 20*a*, 20*b*, 20*c*, 20*d*, 20*e*, 20*f*, 20*g* and 20*h* are connected together in a modular form. A bank of five recharging racks 20*a*, 20*b*, 20*c*, 20*d* and 20*e* are shown in FIG. 3 adjacent to a second bank of which only three recharging racks 20*f*, 20*g* and 20*h* can be seen in FIG. 3. The racks are of modular form such that they can be connected together in banks of five or stacked in banks of two. Electrical connectors are provided along the back of the recharging racks in such a manner that they connect together when the recharging racks are connected in the modular form illustrated. Each recharging rack can be used on its own with a 9 to 12 volt DC power supply or they can be connected into blocks of up to 50. Each recharging rack has 5 slots for receiving handsets. The racks are designed to stack on top of each other with the slots either facing sideways or upwards. Two keyhole slots are provided at the back of each rack for attachment to vertical surfaces.

Figure 4A:
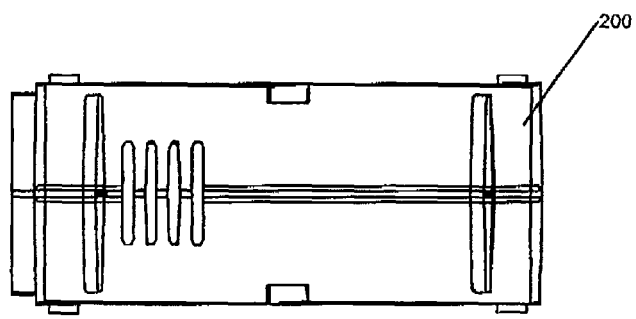
FIG. 4a is a side view of a recharging rack in accordance with an embodiment of the present invention.
Figure 4B:
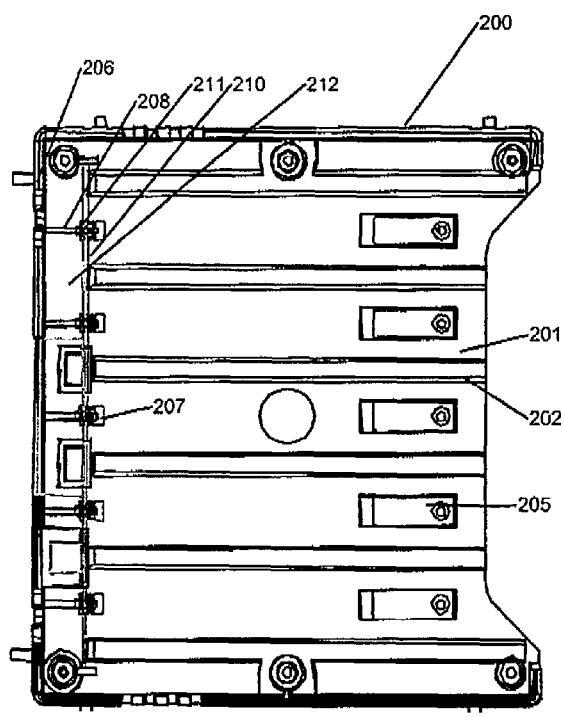
FIG. 4b is a part-sectional diagram through a charging rack in accordance with an embodiment of the present invention.
Figure 4C:
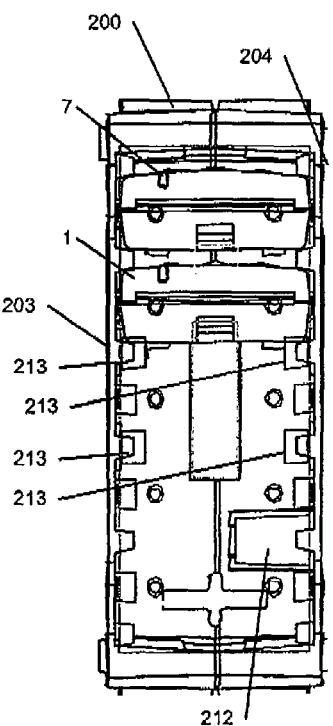
FIG. 4c is a front view of a recharging rack in accordance with an embodiment of the present invention.

As can be seen in more detail in FIGS. 4*a*, 4*b* and 4*c*, an individual charging rack 200 is provided with five slots 201 for receiving handsets 1. Each slot is formed by shelves 202 extending across the two sides 203, 204 of the recharging rack. On the sides 203, 204 within each slot 201 a resilient or sprung mechanism 205 is provided for resiliently holding the handset 1 in the slot 201. The sprung magnetic contacts 207 are mounted directly onto a PCB 210. The magnetic recharging contacts comprise magnetic electrically conductive material—for contacting with the two recharging contacts 12*a* and 12*b* of the handset 1. The PCB 210 is mounted on mounts 208 at the back of the recharging rack 200. The sprung mounts 211 act to mount the magnetic contacts 207 on the PCB 210.

Electrical currents can thus be provided to the magnetic contacts 207 from a 9 to 12 volt DC power supply (not shown) via a power rail running across the PCB 210. DC power connectors 212 are provided on the PCB 210 for the application of power to the PCB 210. Power rail sockets 213 are provided either side to allow the recharging rack 200 to be connected to another recharging rack in a modular fashion. In this way power can be applied to recharge the battery in the handset 1. The current can be applied in either direction and the handset can be inserted into the slot 201 facing Up or facing down. A heat sink 214 is mounted at the back of the recharging rack 200 for dissipating heat.

The charging applied to the batteries in the handsets 1 via the magnetic contacts 207 is controlled by a microprocessor mounted on the PCB. The microprocessor controls the application of power to each slot to give a 60 second charge to each handset 1 in turn. The handset 1 controls the colour of the LED 7 from red to indicate low charge, to orange and to green when it is fully charged. Whilst the communicator is being charged the LED 7 flashes. If a slot 201 is not filled with a handset 1 or if a handset 1 is fully charged, the microprocessor 209 skips the application of power to the magnetic contacts 207 for the slot 201 and applies the charge to the next slot. When there is only one handset which is not fully charged in the rack 200, the handset 1 not yet fully charged receives 60 seconds of charge followed by a 60 second pause before the reapplication of charge. When the handsets 1 in the rack 200 are all fully charged, i.e. the LED 7 for each handset 1 is green, the microprocessor 209 will still control the recharging to apply a top-up 60 second charge occasionally to each handset to ensure that the fully charged state of each handset 1 is maintained.

It can thus be seen from FIGS. 3 and 4 that the recharging rack provides a convenient method of recharging a number of handsets by providing for an arrangement in which the handsets are gripped by a biasing arrangement so that they are held firmly in place and the electrical contacts are magnetically coupled to ensure good coupling.

Figure 5:
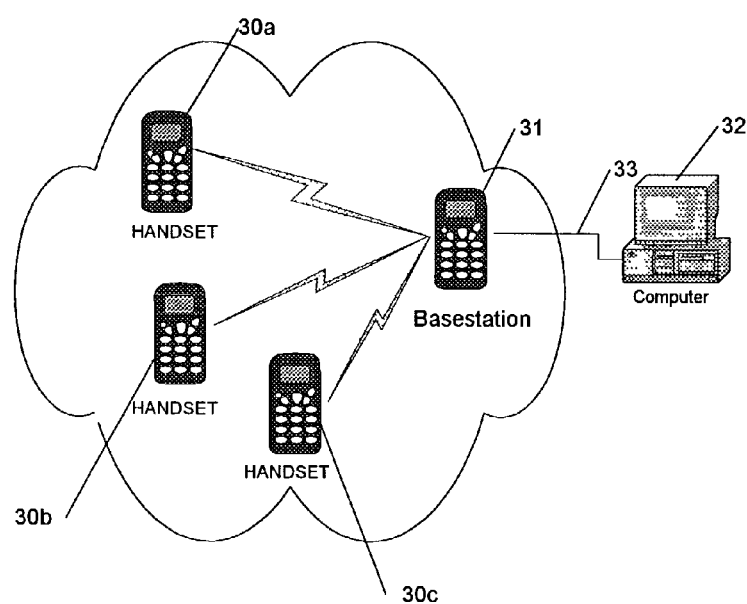
FIG. 5 is a schematic diagram of a participant response system in accordance with an embodiment of the present invention.

FIG. 5 is a schematic diagram illustrating a participant response system in accordance with one embodiment of the present invention. The illustrated embodiment is a conventional configuration in which a plurality of handsets 30*a*, 30*b* and 30*c* communicate with a base station 31 which is connected to a computer 32 for controlling the participant response system. This embodiment of the present invention differs over the prior art configurations in that the base station 31 comprises a handset 1 suitably configured to act as a base station. The base station 31 is connected via the data socket 13 over an RS232C connection 33 to the RS232C port of the computer 32. Thus this embodiment of the present invention provides a more flexible, simplified system which can be provided simply by providing a plurality of configurable handsets together with a serial connector 33 and software for loading onto the computer 32.

Figure 6:
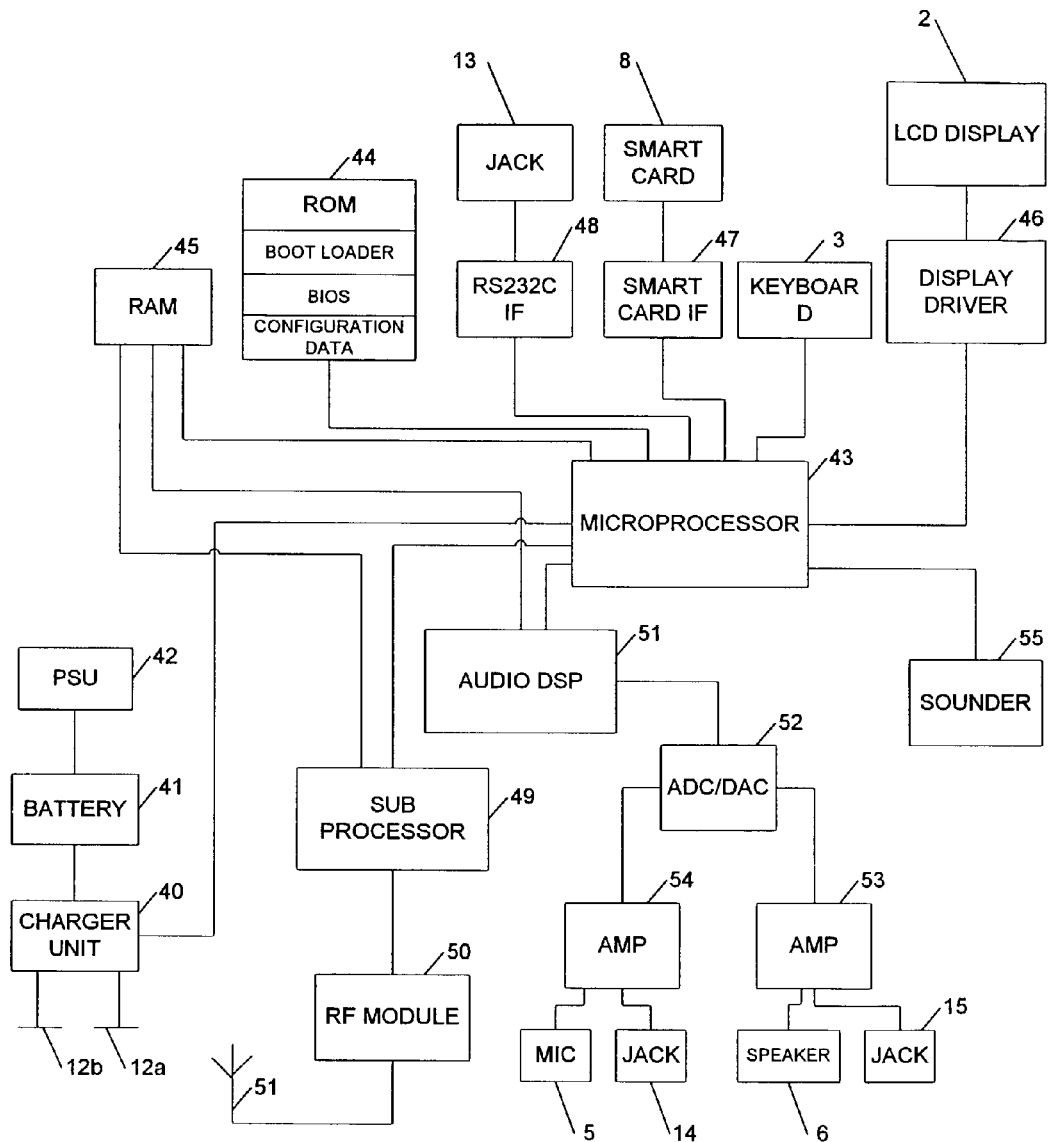
FIG. 6 is a schematic diagram of the components of a handset in accordance with an embodiment of the present invention.

The structure of the handset 1 will now be described in more detail with reference to FIG. 6.

A charger unit 40 is provided connected to the recharging contacts 12*a* and 12*b* for providing charge to a rechargeable battery 41. The charger unit 40 is under the control of a microprocessor 43 for controlling the charging of the battery 41. A power supply unit (PSU) 42 is provided for using the power in the battery 41 to generate the voltages necessary for driving the circuitry within the handset 1.

At the heart of the handset is the microprocessor 43. The microprocessor 43 is controlled by code loaded in a flash read only memory (ROM) 44. Within the ROM 44 there are three sections of code stored, namely a boot loader, a BIOS and configuration data. Each of these three sets of code reside in different addresses within the ROM 44. A microprocessor 43 is also provided with random access memory 45 for use as working memory. The microprocessor 43 is connected to a display driver 46 which in turn drives the LCD display 2. The microprocessor 43 is also connected to the keyboard 3 and to a smart card interface 47 which is provided in conjunction with the smart card slot 8 for reading a smart card 9. The microprocessor 43 is also connected to the RS232C interface 48 provided in conjunction with the data socket 13. A subprocessor 49 is provided for control of the RF module 50 for communication with other handsets 1. The RF module is connected to an aerial 51 housed within the casing of the handset 1. The microprocessor 43 is also connected to a sounder 55 for generating sounds.

An audio digital signal processor (DSP) 51 is provided for digital signal processing of audio input and output. An analogue to digital converter/digital to analogue converter (ADC/DAC) 52 is provided for generating an analogue output for amplification by an amplifier 53 for output to the loudspeaker 6 or for output through the headphone socket 15. The ADC/DAC 52 also receives an analogue audio input from an amplifier 54 which receives its input from the microphone 5 or from a microphone socket 14.

Thus the audio DSP 51 can process input and output audio in conjunction with the microprocessor 43 for transmission by the RF module 50 to other handsets to provide for audio communication between handsets 1.

The microprocessor 43 acts under the control of the code in the ROM 44. It can communicate with a computer acting as a controller via the RS232C interface 48, in which case the handset acts as a base station. The microprocessor 43 can receive commands, configuration data and new configuration code to be loaded in the ROM 44 from the computer using the RS232C interface 48. Also the microprocessor 43 can receive configuration data or computer code from a smart card via the smart card interface 47. The configuration data or computer code received from the computer or from the smart card can be used to reconfigure the mode of operation of the handset, or simply to reset parameters within the handset.

If commands are received from the computer that the handset acting as a base station is required to pass on to the other handsets, the microprocessor 43 controls the sub-processor 49 which in turn controls the RF module 50 to transmit the commands to the other handsets.

When the handset is operating in a keypad mode, i.e. acting as a participant's handset, a participant's response can be input using the keyboard 3. The microprocessor 43 can display this by controlling the display driver 46 to control the LCD display 2 to display the input participant's response. Prior to the input of this response, the RF module 50 may have received a specific question or command to initiate or prompt the input of a response by a participant. The display driver 46 can thus control the LCD display 2 to display a question which requires an answer from the participant. Alternatively, it can display a prompt, e.g. "vote now" or "answer now". Also, the LCD display 2 can display any other information received from another handset by the RF module 50.

The method of configuring the handset by modifying the code in the ROM 44 will now be described with reference to the flow diagrams of 7*a* and 7*b*.

The flash ROM 44 contains a first section of code called a boot loader. This is the minimum code required to enable the handset 1 to operate to load new controlling code e.g. to control the RF module 50. The BIOS code comprises code which is executable by the microprocessor 43. The configuration data comprises data as binary code. This data defines parameters relating to the functionality of the handset. The parameters can include user interface parameters such as the language to be used for the display of information, the fonts to be used, sounds to be used for playback over the sounder 55, and icons to be used. The information can also include modal parameters. Modal parameters can comprise a range of modal states such as a display layout mode as well as functionality modes. Each functionality mode can be set as a set of capabilities, i.e. functions or features which are enabled or disabled. Functionality modes can, for example, include:

Base station mode—this mode can be entered automatically when an RS232 connection to a computer is detected by the RS232C interface 48.

Keypad mode, in which the handset operates as a keypad to allow the input of a participant response but with no audio functionality.

Microphone mode—in this mode the handset acts as a keypad with the microphone enabled to allow the user to input speech for transmission by the RF module 50.

Speaker mode—this mode allows the handset to act as a keypad and enables audio output from the loudspeaker 6.

Intercom mode—in this mode the handset is configured as a keypad and both the audio input and audio output are enabled. The audio output is set on one channel as a transmit channel and the audio input is set on another channel as the receive channel.

Charging mode—the handset enters the charging mode when it is in the charging rack.

Text messaging mode—in this mode the handset acts as a keypad but a participant is able to enter a text message for sending to another handset during the event, e.g. conference.

Alarm mode—in this mode which can run in the background, when the handset looses the signal from the base station it controls the sounder 55 to generate an alarm sound until the base station signal is picked up again. This acts as an out of range alarm and provides two benefit, namely it warns a user if they are out of range of the base station and it also acts as a theft deterrent to deter participants from taking the handset away from the event.

These modes need not be mutually exclusive and a handset can operate in accordance with a combination of these modes. It is even possible for a handset to operate both as a base station and as a keypad for a participant.

Figure 7A:
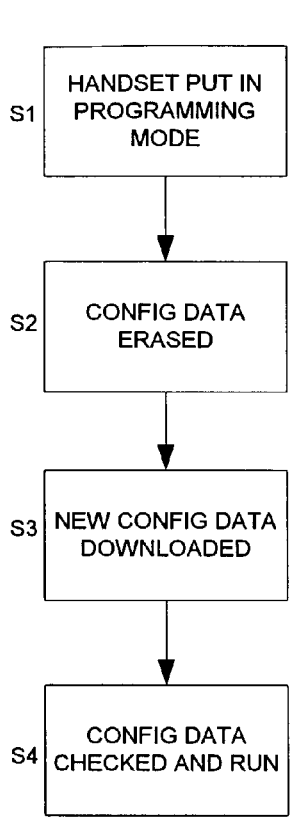
FIG. 7a is a flow diagram illustrating a method of updating the configuration data in a handset in accordance with an embodiment of the present invention.

FIG. 7*a* is a flow diagram illustrating a method of updating the configuration data in the ROM 44.

In step S1 the handset is put in a programming mode. This can be achieved by a command over the RS232C interface from the computer. Alternatively, this can be achieved by the insertion of a reprogramming smart card 9 in the smart card slot 8. Further, this can be achieved by receiving a command from a wireless communication via the RF module 50. When the handset is put into the programming mode, a first step (step S2) is to erase the configuration data in the ROM 44. New configuration data is then downloaded (step S3). This can be downloaded over the RS232C interface 48 from the computer, over the smart card interface 47 from the reprogramming smart card 9, or from the RF module 50 from the remote handset such as a handset acting as a base station. The new configuration data is loaded into the ROM 44 and it is checked and then used in the execution of the operation of the handset (step S4). Thus the reconfiguration of the handset is complete by the updating of the configuration data.

Figure 7B:
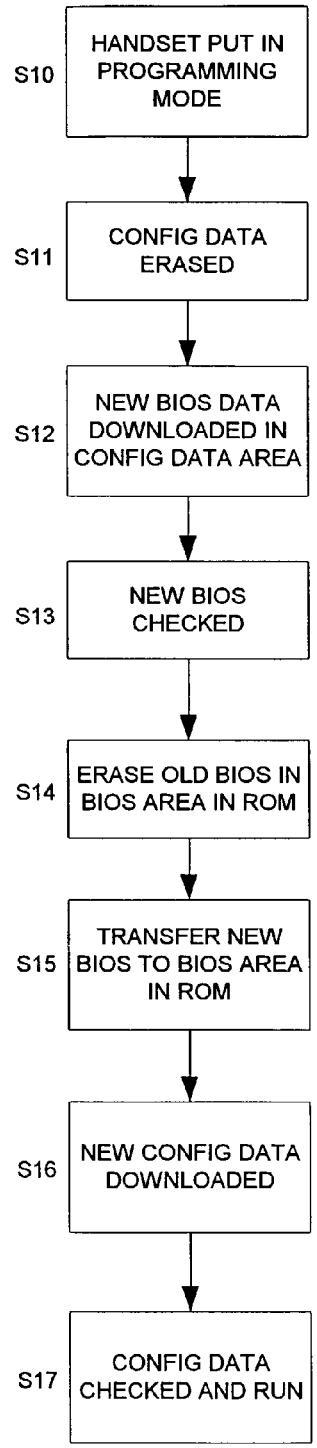
FIG. 7b is a flow diagram illustrating a method of updating the BIOS and configuration data in a handset in accordance with an embodiment of the present invention.

The modification of the configuration data enables mode changes to change the operation of the handset. However, this does not affect the capabilities of the handset which are determined by the executable code, i.e. the BIOS in the ROM 44. During initial manufacture of the handset or during a subsequent complete reprogramming, it is possible to replace the BIOS in order to change the operational capabilities of the handset. The method of doing this is illustrated in the flow diagram of FIG. 7*b*.

The handset is put in the programming mode (step S10). As described in relation to FIG. 7*a* this can be achieved either as a result of a command over the RS232C interface 48, a command received over the smart card interface 47 from a reprogramming smart card 9, or as a result of a command received over the RF module 50. The first step of the programming mode (step S11) is the erasure of the configuration data in the ROM 44. New BIOS data is then downloaded into the configuration data area of the ROM 44 (step S12). The new BIOS loaded into the configuration data area is then checked to confirm that there are no errors (step S13). So long as the check is successful, the old BIOS in the BIOS area in the ROM 44 is erased (step S14) and the new BIOS in the configuration data area is transferred to the BIOS area in the ROM 44 (step S15). New configuration data is then downloaded and stored in the configuration data area (step S16) and the configuration data is checked and used in the execution of the handset (step S17). Thus in this way the handset is completely reprogrammed and reconfigured without risking losing the old BIOS before receiving a valid new BIOS.

The functional structure of the computer 32 acting as the controller of the participant response system will now be described with reference to FIG. 8.

Figure 8:
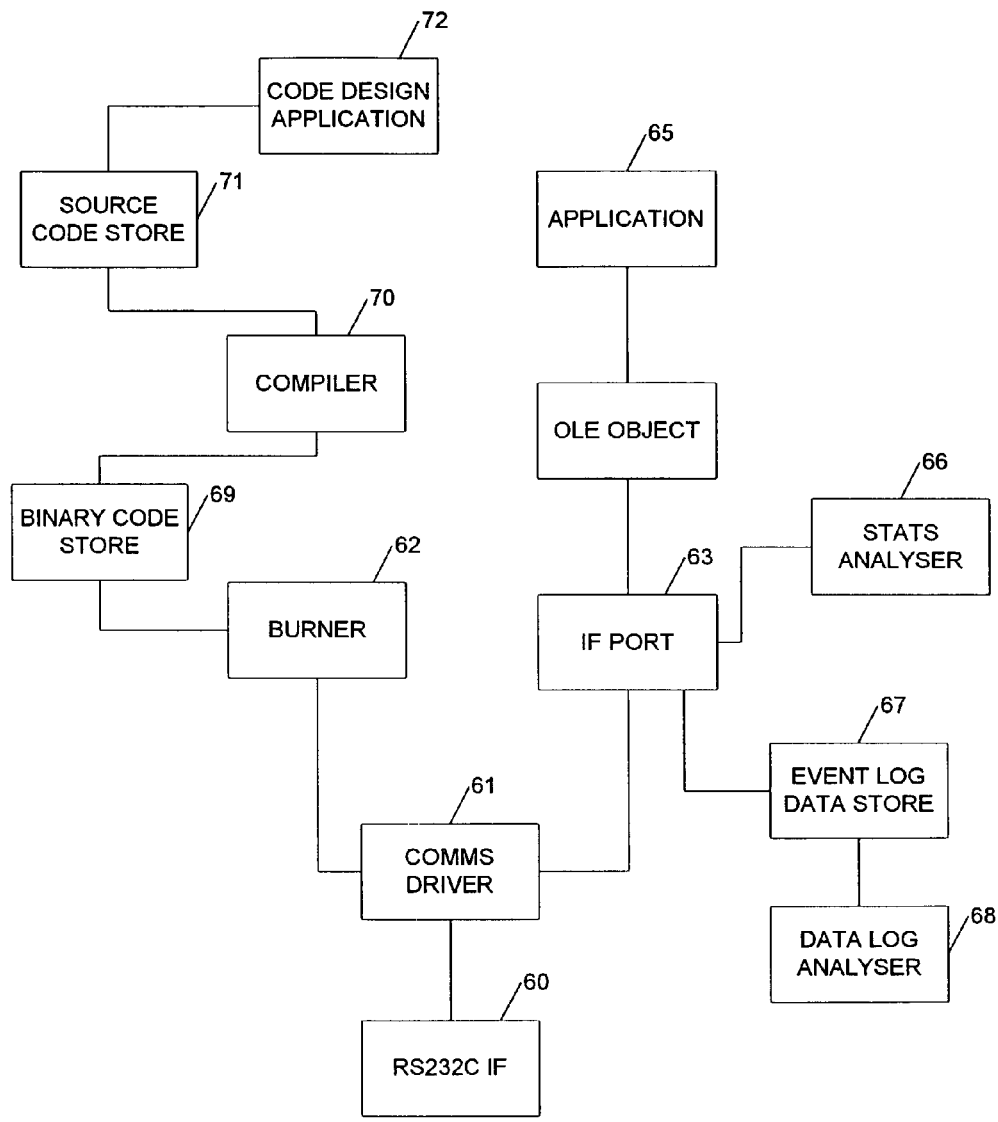
FIG. 8 is schematic diagram of the functional components in a computer system acting as a controller in a participant response system in accordance with an embodiment of the present invention.

FIG. 8 is a schematic diagram of functional units generally executed as computer code within the computer 32. The computer 32 is provided with an RS232C interface 60 to which the communication cable 33 connecting the handset acting as the base station 31 is connected. The software module acting as a communications driver 61 controls communication transmitted over the RS232C interface 60. A burner module 62 is provided for putting the handset into the program mode and for downloading configuration data and a new BIOS as described hereinabove with reference to FIGS. 7*a* and 7*b*. The burner provides a means of downloading executable code into the BIOS and binary data into the configuration data area. The binary BIOS code and the binary configuration data are stored in memory in a binary code store 69. The binary BIOS code and the binary configuration data can be generated by a compiler 70 from source code stored in the source code store 71. The source code can be generated using a code design application 72. In its simplest form the code design application can simply comprise a text processor for writing source code. The code for the BIOS can be written in a computer language, e.g. C. The configuration data can be written as XML. The BIOS can then be compiled by the compiler 70 into code which is executable by the microprocessor 43. The XML can be coded into binary so as to be readable by the microprocessor 43 for use as data during the execution of the BIOS code. Thus the compiler 70 acts to generate compiled code which is executable by the microprocessor 43 within the handset 1.

An interface port 63 is also provided for communication with the communications driver 61. The interface port acts as an interface for communications to and from the base station 31 over the RS232C interface 60. In order to control requests for responses and/or for posing questions requiring answers from participants, an event application 65 is executed within the computer 32. This is linked to the interface port 63 via an OLE object 64. The OLE object 64 allows responses to be returned to the event application 65. It also allows for requests for responses or questions to be sent to handsets 1. For example, the event application 65 can comprise PowerPoint (trade mark). The computer can thus be generating a presentation for display to participants such as conference participants or participants in a lecture. The PowerPoint presentation can ask the participants to vote now or answer a question posed in the presentation. Responses received from handsets 1 are then embedded into and displayed in the presentation by the OLE object 64. This provides for immediate feedback from conference participants.

The interface port 63 is also connected to a statistics analyser 66. This is an application that allows information on communications between the handsets and the computer to be monitored. This can be used for diagnostic purposes.

The interface port 63 is also connected to an event log data store 67 for storing a data log of communication events. This allows for the off-line studying of the data log by a data log analyser 68. The data log analyser can comprise a simple text viewing application to view text stored representing events in the event log data store. The event log can include unique user ID for handsets and event histories for the handsets including low signal notifications, low battery notifications, disconnections, and key inputs, i.e. responses. The low signal notifications can be an indication of lost packets rather than a power level indication.

The operation of a handset will now be described with reference to FIGS. 9 to 13.

Figure 9:
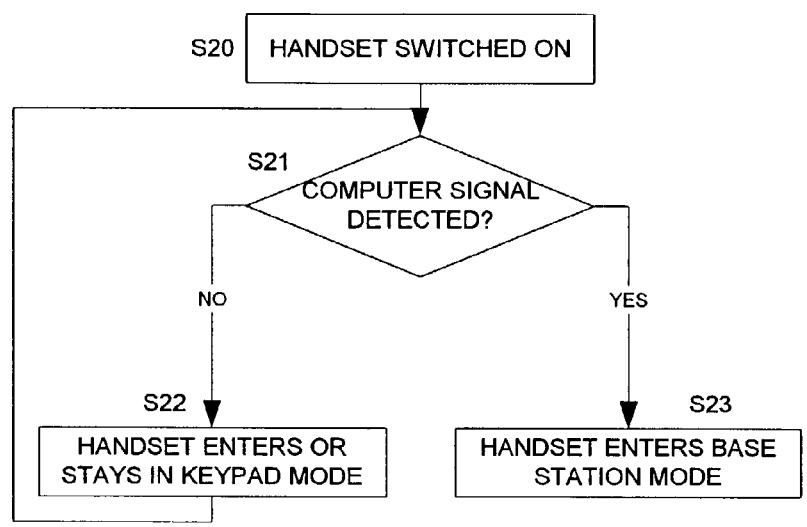
FIG. 9 is a flow diagram illustrating the operations of a handset when it is switched on in accordance with an embodiment of the present invention.

FIG. 9 is a flow diagram illustrating the operation of a handset. When it is switched on (step S20) the handset monitors the RS232C interface 48 to detect if there is a computer signal (step S21). The computer 32 will periodically transmit a signal over the RS232C interface. The handset determined whether the signal carries an instruction for the handset to switch to the base station mode. If no such signal is detected the handset enters a keypad mode (step S22). If the signal is detected the handset enters a base station mode (step S23). In the keypad mode, the handset periodically checks for the computer signal (step S21). Thus at any point during the operation of the handset in the keypad mode (step S22) it can be switched to the base station mode (step S23).

Before describing the operation of the handset in the base station and keypad modes, mode of wireless communication between the handsets should first be explained.

In this embodiment of the present invention the handsets use the wireless frequency of 2400-2483.5 MHz. The system operates in accordance with the ETS 300 328 standard. This communication method is a spread spectrum communication method which provides 80 channels. This is loosely based on the DECT standard. The handsets transmit one frame in 10 ms at one frequency and then change the frequency for each frame using a pseudo-random frequency changing sequence across the 80 different frequency channels. This provides 100 frames per second and the raw data rate is 1.024 MBits per second. The transmission protocol will be described in more detail hereinafter with reference to FIGS. 14 to 18.

Figure 10:
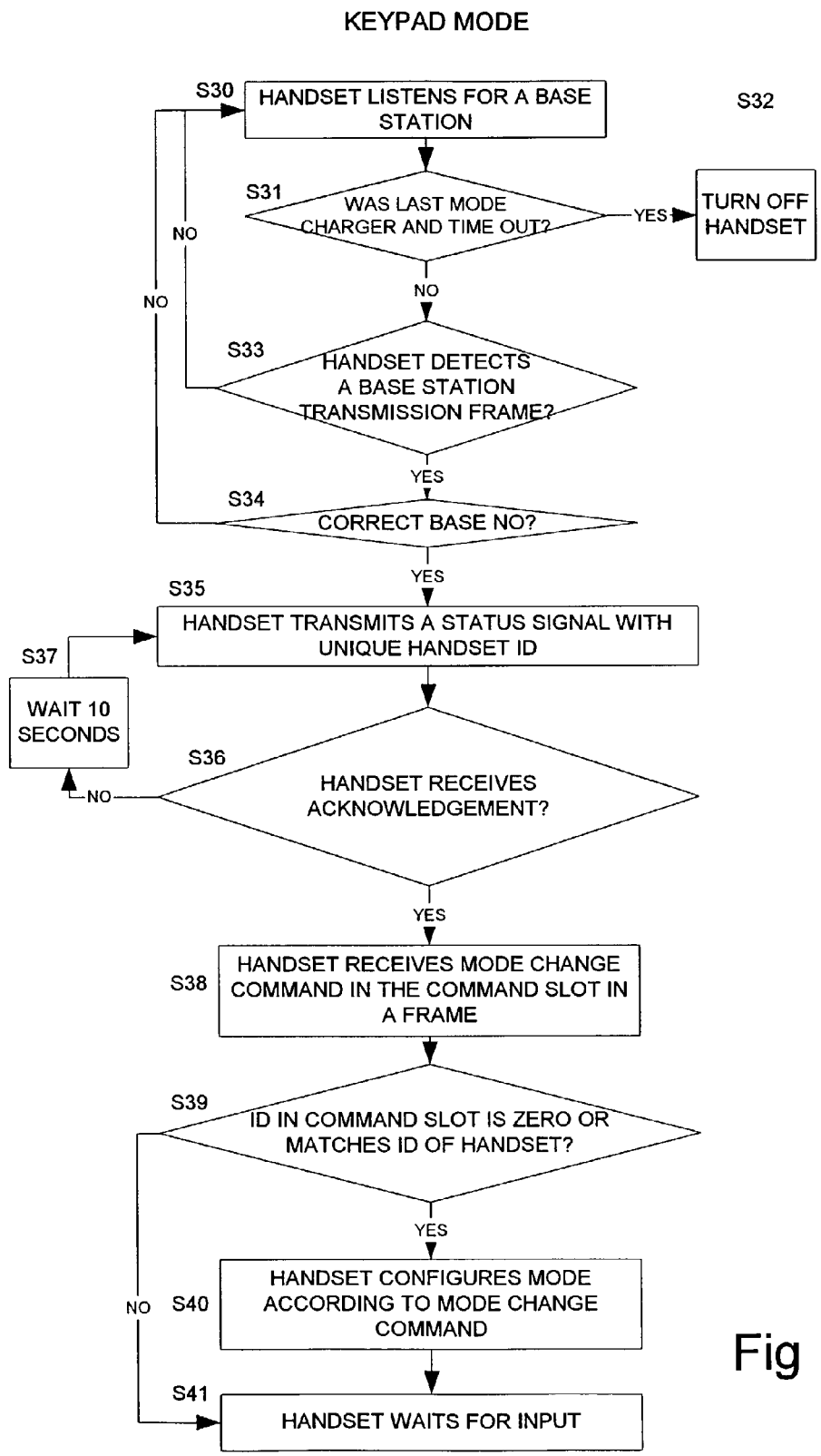
FIG. 10 is a flow diagram illustrating the steps performed when a handset enters the keypad mode in accordance with an embodiment of the present invention.

FIG. 10 is a flow diagram illustrating the operation of a handset in the keypad mode. 36)

The handset turns on its receiver and listens for base station information messages (step S30). The handset moves from listening on one frequency to the next on the frequency table at a rate faster than the base station frequency hopping rate. Whilst potentially extending the capture period this does ensure that success in detecting a base station is not dependent on a single frequency which might be compromised by interference. While the handset does not detect a base station transmission frame (step S33) the handset continues to hop through the frequencies in the frequency table. If no base station transmission frame is detected within a timeout period (step S31) and the previous mode was charger mode, the handset is turned off (step S32). Thus, when a handset is withdrawn from the charging rack 200 or if the recharging rack is switched off, it can automatically switch on the radio receiver and look for a base station. If it does not find one it will automatically turn off. This is a useful feature to facilitate handling of a number of handsets as will be described in more detail hereinafter.

If a handset does detect a base station transmission frame (step S33) and if the handset has been configured to use a specific base number and the base station is not transmitting the base number in the transmission frame (step S34) the base station transmission will be ignored since the base number of the handset is not matched to the base number of the base station. This enables use of groups of handsets to be related to different base stations to avoid interference.

If the base station transmission frame is of the correct base number (step S34) the handset transmits a status signal with a unique handset ID (step S35). Whenever a message is ready to send it is delayed by a random number of slots to reduce collisions with other message from other handsets. If the handset does not receive an acknowledgement from the base station it resends the status message until a base station acknowledgement is returned or a configurable maximum number of retries is reached. If the maximum number of retries is reached the handset stops trying to send the status message. The handset will wait 10 seconds (step S37) and will then transmit a new status message (step S35). If the handset receives an acknowledgement (step S36) the handset can then receive a mode change command in the command slot in a frame from the base station (step S38). The handset will continue to send a status message every ten seconds no matter which mode it is in. If the handset ID in the command slot is zero or if it matches the ID of the handset, the handset configures the mode of operation of the handset in accordance with the mode change command (step S40). The handset then waits for an input (step S41). If the ID in the command slot is not zero and it does not match the ID of the handset (step S39) the mode change command is not directed to the handset and it is thus ignored and the handset waits for an input (step S41).

Although in this flow diagram the mode change command is described as being received immediately after connection of a handset to the base station, a mode change command can be received and actioned at any time by a handset. Also, the handset can enter the recharger mode at any time the handset is put in the recharging rack.

Figure 11:
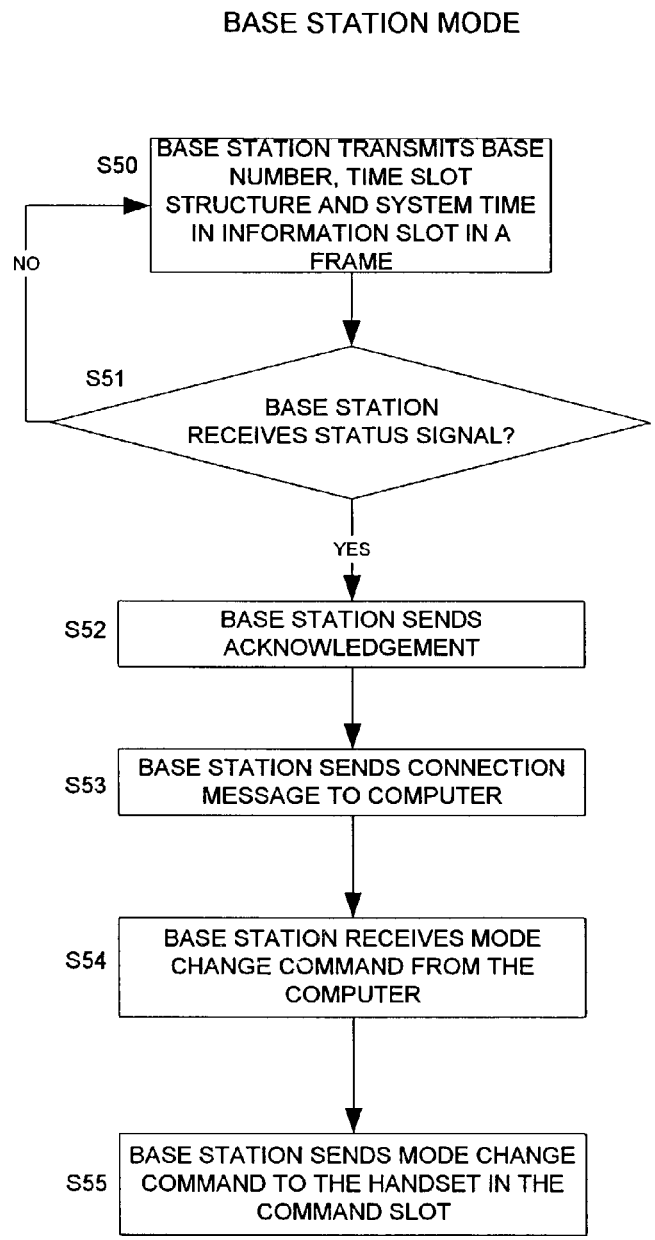
FIG. 11 is a flow diagram illustrating the steps carried out by a handset when it enters the base station mode in accordance with an embodiment of the present invention.

FIG. 11 is a flow diagram illustrating the operation of the handset in the base station mode.

In step S50 the base station transmits a base number, a time slot structure and the system time in an information message in a slot in every frame. If a base station receives a connection message (step 851) the base station sends an acknowledgement (step S52). The base station then sends a connection message to the computer over the RS232C interface (step S53). The connection message includes the handset's unique ID. The base station can receive a mode change command from the computer (step S54) and the base station sends the mode change command to the handset in the command slot in a frame (step S55).

The computer stores connection information including the handset's unique ID and statistical information regarding connection with the handset as will be described in more detail with reference to FIG. 13.

Figure 12:
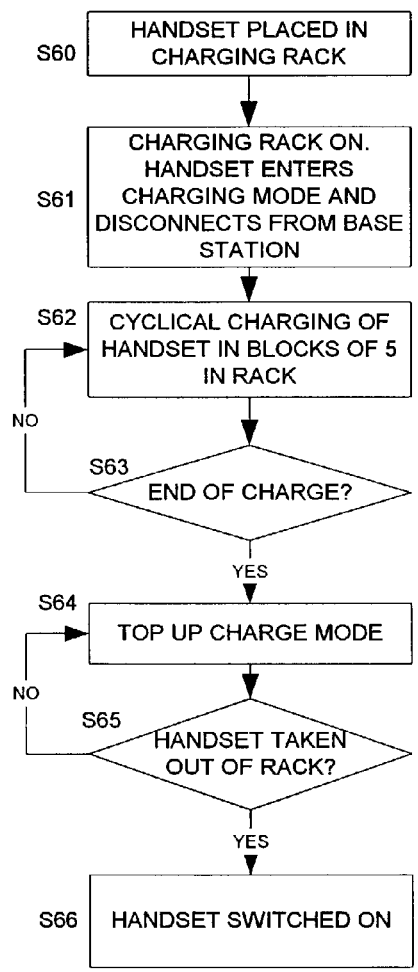
FIG. 12 is a flow diagram illustrating the steps performed by a handset during recharging (the recharging mode) in accordance with an embodiment of the present invention.

The operation of the handset when used in conjunction with the charging rack will now be described with reference to the flow diagram of FIG. 12.

In step S60 the handset is placed in the charging rack. If the charging rack is on, the handset detects this and enters the charging mode and disconnects from the base station (step S61) by turning off its radio. The charging rack then performs cyclical charging of the handset in blocks of five (step S62). The microprocessor in each handset controls the charger unit 40 in each handset to control the uptake of charge. This process continues until the charging has been completed (step S63). The charging rack will then enter the top-up charge mode (step S64). In the top-up charge mode the handsets are given period 60 second charges in order to keep them topped-up. This will continue unless a handset is taken out of the rack (step S65). When a handset is taken out of the charging rack the handset is switched on (step S66). The process illustrated in the flow diagram of FIG. 9 will then be carried out. Since it is unlikely that a signal from computer will be detected, i.e. that the RS232 connector 33 will be rapidly connected to the handset, generally the handset will enter the keypad mode (step S22).

The recharging rack of the embodiment of the present invention enables for convenient control of a number of handsets used during an event. The system provides a convenient method of powering down the handsets. When the handsets are placed in the charging rack 200, whether they are on or off, they enter the charging mode. When they are removed or when the charging rack is switched off i.e. when they no longer detect charging power being provided to the contacts 12a and 12b, the handsets turn on and try to connect to a base station (step S30). If a base station is detected (step S31) they connect. If not they turn off. Thus this provides a convenient way of controlling a plurality of handsets simultaneously. This allows them to be turned off by turning off the base station and turning off the recharging rack. It also allows for the handsets to be turned on automatically. This is useful for testing of the handsets as a group by switching off the recharging rack to allow them to connect to a base station. This is also useful during an event such as a conference, lecture, seminar, meeting etc when handsets can automatically switch on and connect (to a base station) for use by a participant. This avoids the need for a participant or organiser to switch on the handset. As the handset is withdrawn from the recharging rack by the participant or the organiser, it switches on and connects. Similarly when the handset is replaced in the recharging rack it switches to the recharging mode and disconnects from the base station. There is thus no need to remember to switch the handset on or off at the beginning or end of an event. This is a boon to conference organisers for the simplification of the process and reduces the input and cooperation required by the participants.

An important feature of the participant response system of an embodiment of the present invention is the ability to monitor the state of communications between a base station and the handsets. In voting applications, it is an important feature to ensure that the potential voter is in a position to be able to vote when applicable. If their handset has lost communication or has a flat battery for example, they are not able to vote. For certain applications where voting has a legal consequence, it is thus essential to monitor the communication status of handsets operated by voters. In this way, when a vote takes place it is possible to determine that the voter was able to communicate their vote and if they did not it must have been because they chose not to.

Figure 13:
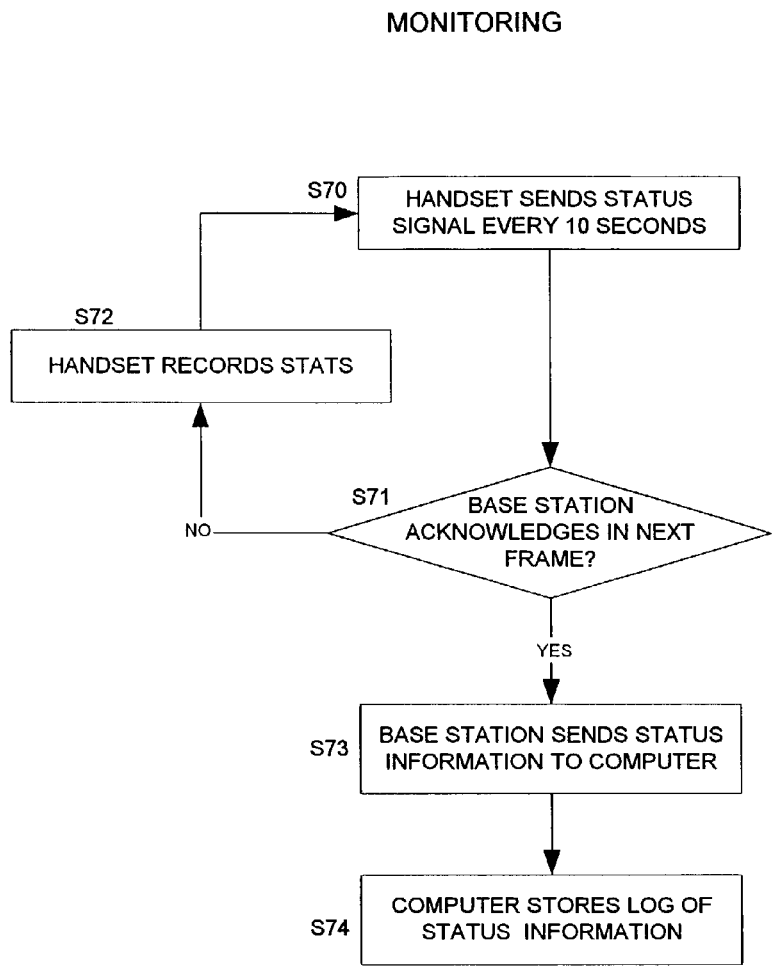
FIG. 13 is a flow diagram illustrating the steps performed during monitoring of communications between a handset and a base station in accordance with an embodiment of the present invention.

FIG. 13 is a flow diagram illustrating a method of monitoring communication status in accordance with an embodiment of the present invention.

The handset periodically, e.g. every 10 seconds, sends out a status message signal (step S70). The handset records statistics about all messages sent and received. The status message contains statistics information which can include the time, i.e. the system time at which communication did not occur frames received per second, send retries, message send delays, battery status, signal strength with the handset's unique ID. If the base station sends an acknowledgement to the handset in the next frame (step S71) the base station sends the status information to the computer 32 (step S73). The computer 32 then stores this information in the event log data store 67 (step S74). This data is stored to form statistical data on communications with the handset. Thus the computer stores the data every 10 seconds to build up a picture of the communications with the handset. Each handset had its own record identified by its unique ID.

Thus in this way a record of current communication quality is stored at the handset and a record of past communications are stored at the computer. The computer is thus able to identify when communications with the handset broke down and the event log data will enable identification of a possible reason for this e.g. the last status message signal indicated low battery and hence the battery may have run out, or the last status message signal indicated a low signal strength indicating that the handset may be out of range. The signal strength can be indicated by the number of packets received per second rather than an absolute power level. Also the number of lost packets and the number of retries can be recorded. Periodically the computer can send a command requesting the download of the recorded statistics from the handset. This information can be transmitted over the wireless communication link and stored in the event log data store 67. Thus in this way the computer can obtain a complete picture of the communication status between the base station and the handsets.

The communication protocol for the wireless communication between the handsets will now be described with reference to FIGS. 14 to 17.

Figure 14:
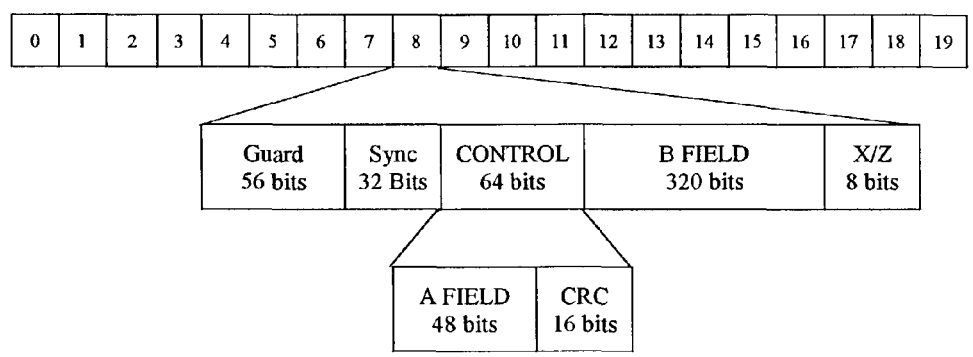
FIG. 14 is a diagram illustrating the structure of a time frame (a frequency hop) used in the communication between the handset and the base station in accordance with an embodiment of the present invention.

FIG. 14 is a diagram illustrating a time frame. Each time frame represents a transmission of data over a 10 millisecond period at a single frequency. Thus the frames are transmitted at 100 frames per second at a data rate of 1.024 MBits per second. Each time frame is divided into 20 slots numbers 0 to 19 in FIG. 14. Thus each slot has a capacity of 512 bits. As can be seen from FIG. 14, each slot comprises an initial 56 guard bits followed by 32 sync bits. The sync bits are followed by 64 control bits comprising 48 A field bits and 16 cyclic redundancy check (CRC) bits. The control bits are followed by 320 B field bits and then 8 X/Z bits. The B field can contain either 320 bits of ADPCM (adaptive differential pulse code modulated) audio or 32 bytes of CRC protected data.

In each frame each slot is a slot type for carrying different data. In this embodiment of the present invention there are two different time slot structures used. FIG. 15 is a table illustrated a first time slot structure. In this time slot structure the second slot comprises the information slot. Slots 4 to 7 comprise 4 audio slots to be configured as audio transmit or receive channels. Commands are transmitted in slot 18. Messages from the handsets can be transmitted in the message slots.

FIG. 16 is a table illustrating a second time slot structure. In this time slot structure the second slot is the information slot and slots 4 to 11 provide 8 audio slots for providing audio transmit or receive channels. Once again commands are sent in the command slot 18. Messages from the handsets are transmitted to the base station in the message slots.

FIG. 17 is a table illustrating the information slot. A first -field in the information slot is the first 2 bytes which indicate the base number of the base station. The second field comprises the next 4 bytes which indicate the networked time. The third field is the slot structure and this indicates whether the time slot structure illustrated in FIG. 15 or the time slot structure illustrated in FIG. 16 is being used. The fourth field is a field indicating whether a command is present in the frame or not.

Figure 18:
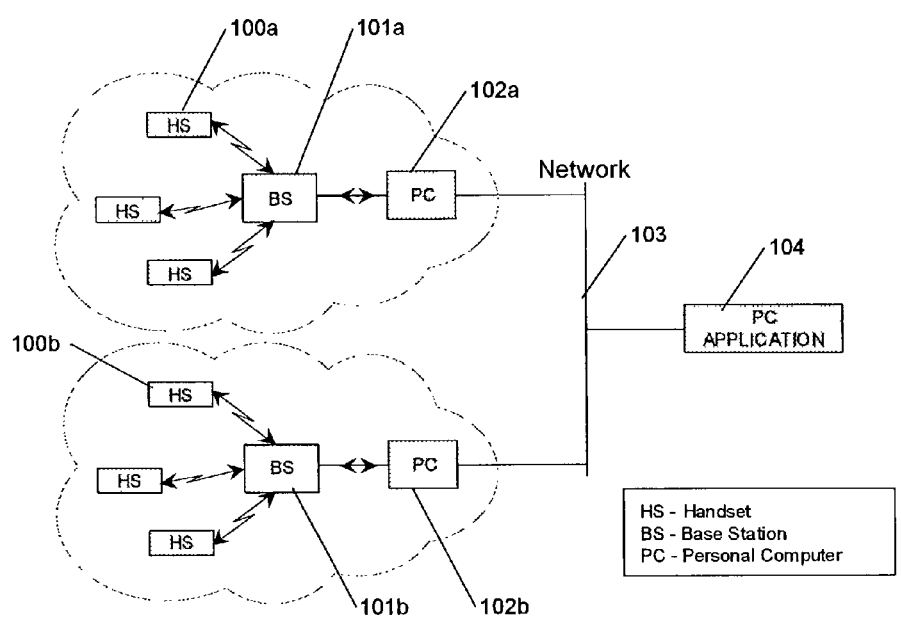
FIG. 18 is a schematic diagram of a participant response system comprising two independent groups of handsets in accordance with an embodiment of the present invention.

Another embodiment of the present invention will now be described with reference to FIG. 18 in which the participant response system is configured to provide two separate participant response systems independent of one another.

As can be seen in this arrangement, the two networks do not overlap. Each network comprises a handset configured as a base station 101a and 101b, each being connected to a respective computer 102a and 102b. Each base station 101a and 101b communicates with respective handsets 100a and 100b. The computers 102a and 102b are connected over a network 103 to a computer 104 running a controlling application.

Each computer 102a and 102b can include a separate controlling application to control each network. In this way the system provides for participant response systems usable at several single sites and controllable independently of each other. The computer 104 can provide an overall control or configuration function.

Another embodiment of the present invention will now be described with reference to FIG. 19 which illustrates the participant response system configured to operate without the use of a computer.

In this embodiment a handset is configured as a base station 111 and this communicates with a network of handsets 110. One handset is configured as a master handset 112 and this communicates with the base station 111. The master handset 112 performs the controlling function performed by the computer in other embodiments. The master handset 112 can initiate a response from participants and display and process the results. This system is particularly suited to a dedicated voting and/or audio system.

Figure 19:
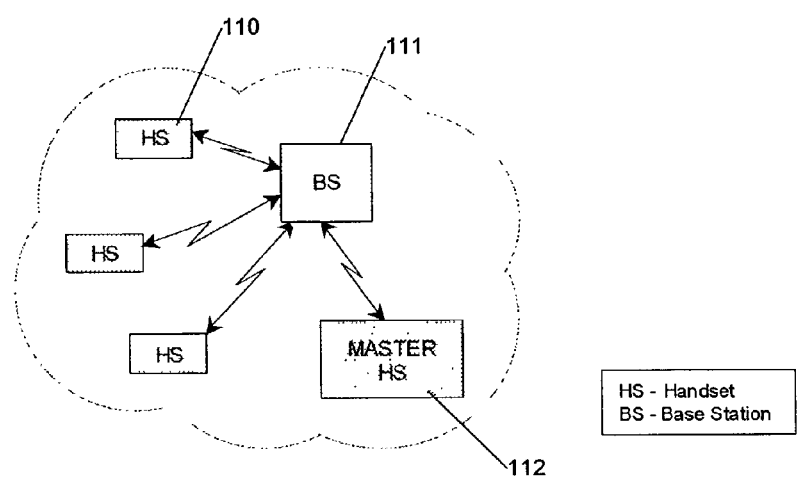
FIG. 19 is a schematic diagram of a participant response system in which a master handsets acts as a controller in accordance with an embodiment of the present invention.

Although in the embodiment illustrated in FIG. 19 one handset is configured as a base station 111 and another handset is configured as a master handset 112, in an alternative embodiment of the present invention, the functionality of the base station and the master handset can be combined in a single handset. Thus in such an arrangement the handsets 110 communicate directly with a master handset.

Figure 20:
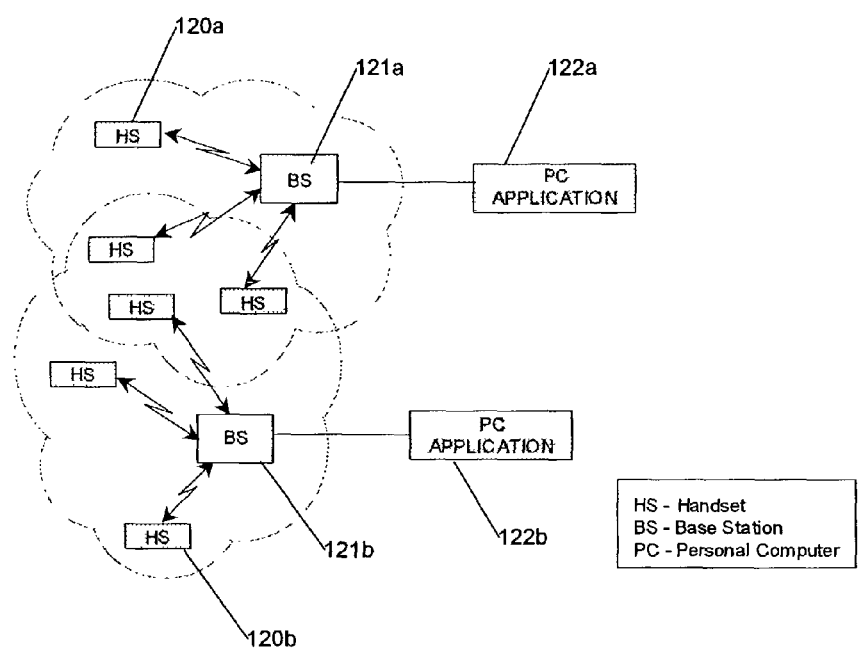
FIG. 20 is a schematic diagram of a participant response system comprising two independent but overlapping groups of handsets in accordance with an embodiment of the present invention.

Another embodiment of the present invention is illustrated in FIG. 20 which comprises a participant response system configuration in which there are two independent groups of handsets configured as two independent but overlapping networks.

In this embodiment a first group of handsets 120a communicate with a first base station 121a and a first computer running a controlling application 122a. A second group of handsets 120b communicate with a second base station 121b under the control of a computer running a controlling application 122b. The communication ranges of the two base stations 121a and 121b overlap and thus handsets can be within communication range of both base stations 121a and 121b. However, in the configuration of this embodiment of the present invention each base station is configured to have a different base number and each handset is similarly configured to have the same base number. This ensures that each group of handsets 120a and 120b communicate with respective base stations 121a and 121b only. Where a base station is in communication range of both base stations 121a and 121b, communication is only set up with the correct base station having the correct base number for the handset as described with reference to the flow diagram of FIG. 10 and in particular with reference to step S34.

Thus, this embodiment of the present invention overcomes the problem of trying to keep the radio frequency area of adjacent participant response groups separate. It is possible to operate two separate participant response events despite an overlap of the radio frequency communication range of the base stations. It is also possible for the participant response system to be set up as a response system for two sub-events of the main participant response event. For example, during a conference there may be two different but simultaneous workshops running in adjacent rooms or buildings. The system of FIG. 20 enables groups of handsets to respond independent to the correct sub-event without interference.

Although in this embodiment of the present invention two separate computer applications 122a and 122b are shown, it is possible for a single controlling computer application to be used to control two separate groups of handsets via separate base stations. In such an arrangement this enables the responses of the different groups to be handled and processed separately. It also enables groups of participants to communicate with one another, e.g. by audio as a group without interfering with or being heard by another group. Thus the arrangement can be used to extend the range of a participant response system using multiple base stations acting independently, i.e. with different base numbers. Groups of handsets will be associated with respective base stations. Handsets must however stay within range of the respective base station and thus this limits the areas accessible to handset users. To avoid this the base stations can be arranged close to one another or in areas ensuring that the communication range covers all areas accessible to the participants.

Another embodiment of the present invention will now be described with reference to FIG. 21 which is particularly suited to a participant response system having a large number of handsets or a large site. This embodiment of the present invention is similar to the previous embodiment of the present invention utilizing a single computer application, but in this embodiment the base stations 131a and 131b do not use different base numbers. In order to extend the range of the communication network, multiple base stations 131a and 131b are used having the same base number. A network of handsets 130a, 130b, 130c, 130d and 130e can communicate with either base station 131a and 131b. As can be seen, handset 130b can communicate with either base station since it is within communication range of either base station 131a and 131b. Each base station 131a and 131b is connected to a computer 132 running a controlling application.

Figure 21:
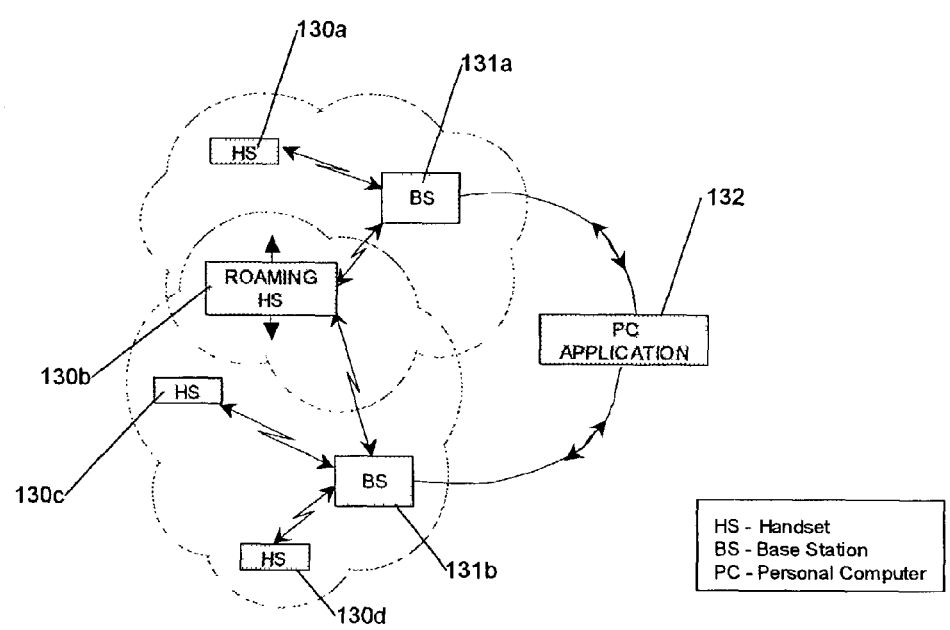
FIG. 21 is a schematic diagram of a participant response system using two base stations to extend the range in accordance with an embodiment of the present invention.

It can thus be seen from FIG. 21 that the participant response system provides an extended communication range for an event enabling the handsets to roam over a greater area. A handset can communicate with the closest base station. The decision on which base station to connect to can for example be determined by signal strength. This requires the handset to dynamically select which base station is the best base station to communicate with.

Since single computer application 132 controls the base stations 131a and 131b, all responses are processed centrally.

In the embodiments illustrated in FIGS. 20 and 21, where multiple base stations are used, it is important that communications between base stations and each handset do not interfere. In the communication protocol used in the embodiment of the present invention there are 80 frequency channels available. Each base station performs frequency hopping every 10 milliseconds, i.e. every data frame in a predetermined pseudo-random sequence which is common to the base stations. At each frequency hop, i.e. each frame, data is transmitted and received in a two-way communication protocol between a base station and the handset.

In order to avoid the same communication channel being used by different base stations, i.e. in order to avoid a base station using the same frequency channel at the same time, each base station operates in accordance with the same pseudo-random frequency changing sequence but they are out of step to avoid co-channel use.

Figure 22:
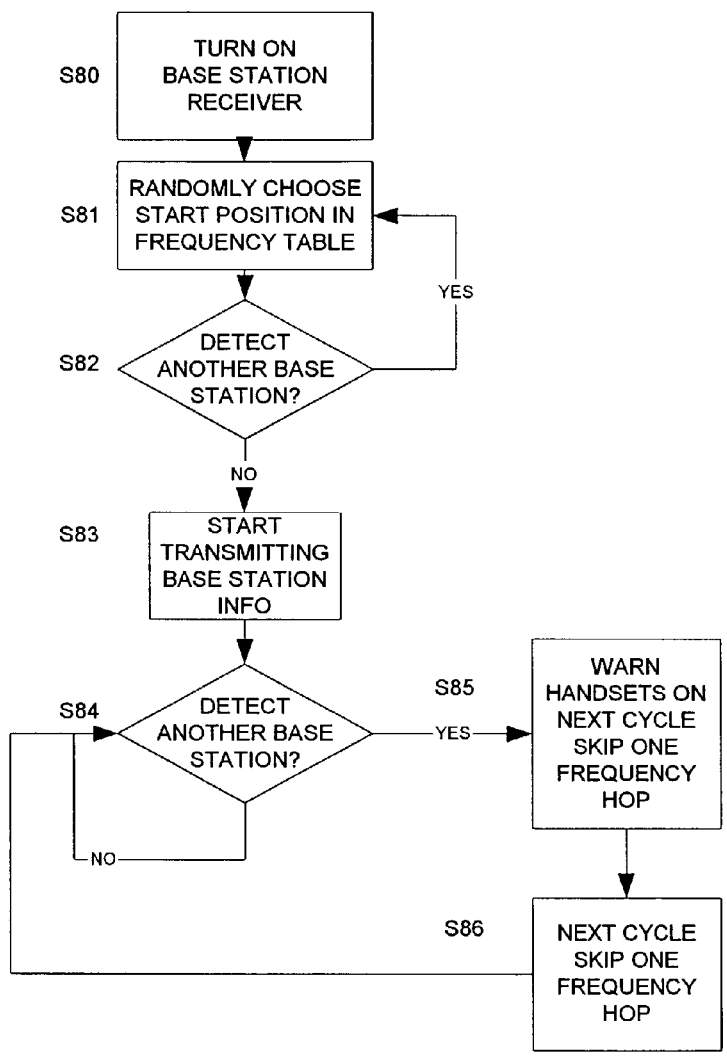
FIG. 22 is a flow diagram illustrating a method of operating a participant response system utilizing more than one more base station in accordance with an embodiment of the present invention.

A process for ensuring this is illustrated in the flow diagram of FIG. 22.

When a base station is turned on (step S80) it turns on its receiver and randomly chooses a frequency to listen on by randomly choosing a start position in a frequency table (step S81). The frequency table stores the sequence of frequency hops for the spread spectrum communication. If a communication from another base station is detected at that frequency, another frequency is randomly chosen as the start frequency in the pseudo-random frequency changing sequence (step S81). This is repeated until no other base station is detected and in this way common use of any of the 80 channels by more than one base station is avoided.

Having now set up to start the frequency hopping sequence at a frequency, the base station operates to search for communications with handsets by transmitting information packets and monitoring for status message signals from handsets. During operation the base station continually monitors for transmissions from other base stations (step S84). When such transmissions are detected, a command is sent to the handsets with which the base station is communicating, warning them that on the next cycle the frequency hop will skip one hop (step S85), then on the next cycle the base station skips one frequency hop for communications with the handsets (step S86). The base station then returns to detecting whether there is another base station operating in synchronization with the frequency hopping sequence (step S84). In this way the base station continuously skips frequency hops to find a position in the sequence of frequency hops that is not being used by another base station. Thus in this embodiment of the present invention which uses 80 frequency channels which are used statistically equally by the frequency hopping pseudo-random sequence performed by each base station, it is possible for the communication protocol to support 80 different base stations operating at different points in the frequency hopping cycle without interference.

Although in the embodiments of the present invention described hereinabove 80 frequency channels are available, this is based on the ETS 300 328 standard operated in the UK and other countries. However in France, for example, the standard only allows 36 channels, whilst in Spain it supports only 29 channels.

In the embodiments described with reference to FIGS. 20 and 21, the base number for the base station handset defines a group but can be considered as a group number. A group number enables handsets and base stations to operate in a self-contained network within a larger network when more than one base station is used. The base number can be set for a base station using a smart card, or by a controlling computer or master handset. It can also be set using the keyboard. Also, the base number can be set on a handset in the same way. If it is not set, by default a handset can connected to the nearest or first base station that it detects communication from and select to use the base station's base number.

The methodology described with reference to FIG. 22 is particularly suitable for roaming networks of participant response systems. For example, handsets could be given to pupils during a museum trip by a class of students. A teacher can hold the master handset and set questions to the pupils. Because the networks are mobile, a base station may detect coincidence with another network, thus causing it to adjust its cycle as described with reference to FIG. 22.

So far the audio capability of the participant response system has not been described in detail. The communication protocol either provides four or eight channels for audio transmission, i.e. four or eight slots in each frame as described with reference to FIGS. 15 and 16. Each audio channel can be set up in accordance with an audio mode to either be a receive or transmit channel. These can be dynamically changed by a controller over the radio frequency network.

Within groups of handsets having the same base number, it is possible for the handsets to be set in an intercom mode whereby participants can communicate with one another using one transmit and one receive channel. In order to enable communication between pairs of handsets, a controller will need to enable a transmit and receive channel between pairs of handsets. It can also be possible for the controller to be set to ensure that each handset receives on the same channel from a transmit channel from a single handset, i.e. the audio from a single handset can be broadest to handsets in the same group.

The controller can give priority to some handsets and a table of the levels of priority can be stored within the controller.

The audio capability of the handset enables the handset to be used by a presenter in a conference or seminar. The audio can be broadcast to other handsets in the group. It can also be broadcast to a handset connected with an amplifier and loudspeaker to broadcast the audio to the conference participants. Thus use of a handset by the presenter and a handset controlling a loudspeaker in conjunction with a base station either separately or in combination with one of the handsets provides for a wireless public address system. The presenter's handset or the loudspeaker controlling handset can comprise the base station or there can be a separate base station.

In a public address system used in for example a conference, conference participants can be provided with handsets. When a conference participant wishes to speak, a presenter can use a controller to allow the participant to speak by enabling their audio transmit channel. This channel can be the same channel, thereby preventing the presenter from speaking, or a different channel enabling both the presenter and the participant to speaker. The handset controlling the loudspeaker can thus output the audio from both the presenter and the participant. If audio is present on two channels, i.e. both from the presenter and the participant, the handset can be configured to mix the audio from the two channels and output this to the loudspeaker. Alternatively, separate handsets can be provided to receive audio on separate channels and a separate mixer can be provided to mix the audio outputs from the headset outputs of the handsets to provide a mixed audio signal to the loudspeaker.

It can thus be seen that the participant response system not only provides a flexible, configurable participant response system for receiving responses from participants to questions or response events during an event, it also enables participants to receive and transmit audio, thereby providing a flexible, convenient wireless public address system usable not just by the presenter but also controllably by the participants.

An embodiment of the present invention will now be described in which the audio capability of the system is used as a wireless simultaneous translation system. This capability can be used in conjunction with the participant response capability as described hereinabove for previous embodiments.

This system of the present invention is based on providing a single language in a single communication channel. The communication channel for each handset is reserved for a specific language but is configurable either to receive or transmit in that channel. This enables participants to listen and when allowed speak using the same channel. It also provides for control of a handset operated by a translator to automatically switch between receive and transmit capabilities of channels used by the translator so that the translator can automatically translate from a first language into a second language and from the second language into the first language when required, i.e. when a participant wishes to speak in a second language. By maintaining the channels the same for languages, other translators translating from the first language to, say, a third or fourth language, need not switch their channels. A controller can automatically determine the language requirement of the speaker who has requested to or been permitted to speak. This enables the controller to identify the translator and to control the switching of the channel for the speaker to transmit and for the translator to receive. Also for the translator the second channel for the other language spoken by the translator is switched to transmit.

Figure 23:
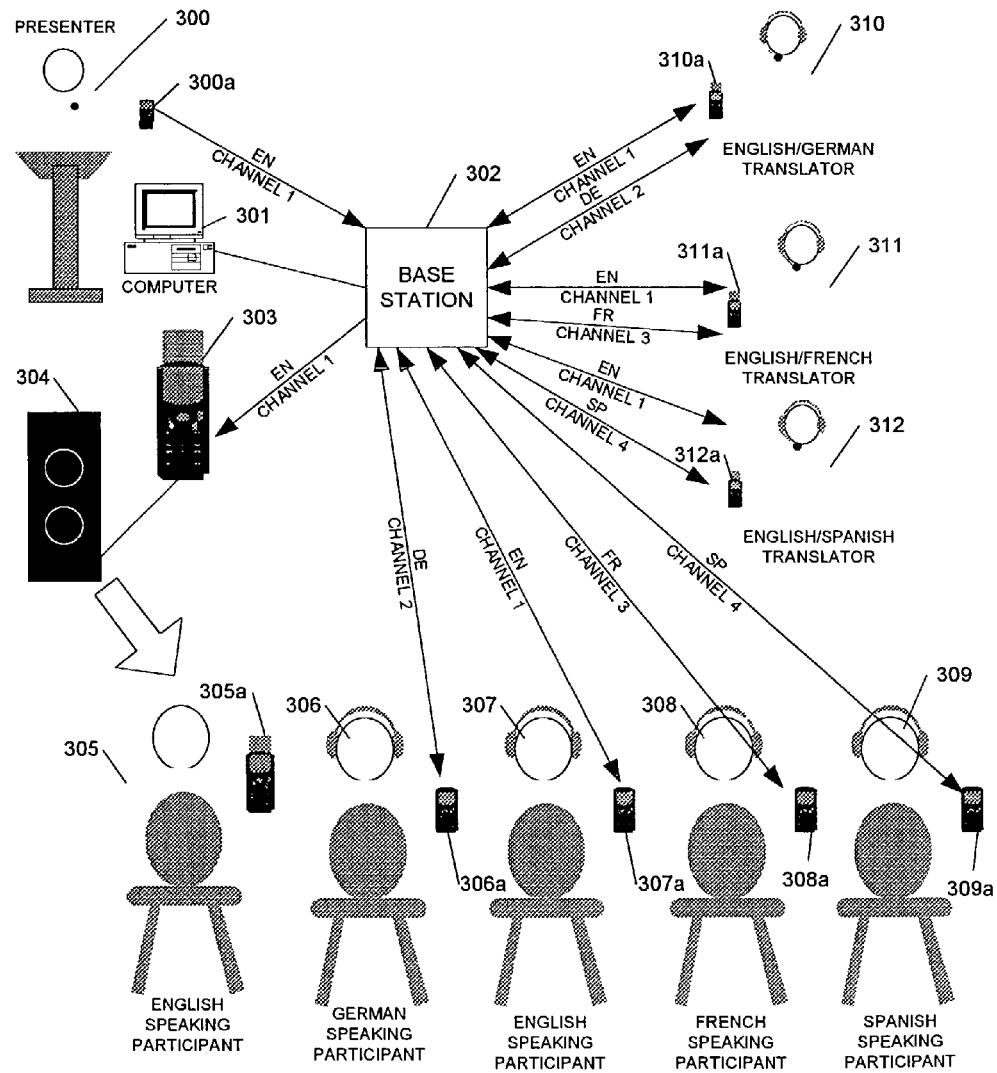
FIG. 23 is a schematic diagram of a translation system incorporated in a participant response system in accordance with an embodiment of the present invention.

A simultaneous translation system is illustrated in FIG. 23. Assuming a presenter 300 possessing a handset 300a presents in English and thus the floor language of the conference is English. The presenter or a Chairman of the conference has use of a computer 301 (or a master handset) acting as a controller. A base station 302 (or a number of base stations) are provided for relaying communications. The presenter's handset 300a is set to transmit audio in English on channel 1. Thus, channel 1 is reserved as the English language channel. A loudspeaker controlling handset 303 is provided and set up to receive on channel 1, i.e. to receive audio in English. The headset output of the handset 303 is connected by an amplifier to the loudspeaker 304 to thereby act as a public address system for providing the English language audio so as to be audible throughout the conference location. In this embodiment a participant 305 is an English-speaking participant and thus is able to listen to the presentation without requiring an audio output from the handset 305a provided to the English-speaking participant. Another English-speaking participant 307 may however wish to listen to the presentation using a headset and this is possible by using a headset connected to the headset socket of their handset 307a which receives the English audio on channel 1. Where participants are not English-speaking and wish)to listen to the presentation simultaneously translated into other languages, a simultaneous language translation capability is required. In this embodiment three simultaneous translators are present at the conference. An English/German translator 310 with an associated handset 310a, an English/French translator 311 with an associated handset 311a and an English/Spanish translator 312 with an associated handset 312a. Each of these translators uses two communication channels. When the presenter 300 is speaking an English language audio is present on channel 1, they each receive English language audio on channel 1, i.e. their handsets 310a, 311a and 312a are set such that the English channel 1 is set as a receive channel. Their second channel is set to be transmit channels to transmit the simultaneous translations. For the English/German translator 310 the second channel comprises the German channel 2, for the English/French translator 311 the second channel comprises the French channel 3 and for the English/Spanish translator 312 the second channel comprises the Spanish channel 4. Thus in this way a German-speaking participant 306 has an associated handset 306a set to receive on German channel 2. The French-speaking participant 308 has an associated handset 308a set to receive the French channel 3. The Spanish-speaking participant 309 has a handset 309a set to receive the Spanish channel 4.

Figure 24:
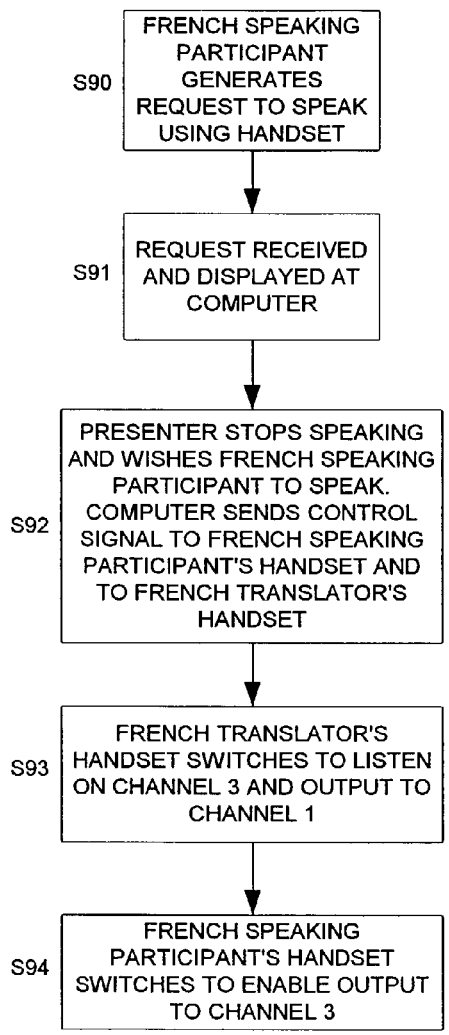
FIG. 24 is a flow diagram illustrating the operation of the translation system of FIG. 23 in accordance with an embodiment of the present invention.

What happens when a participant wishes to speak in a language to the floor language, i.e. non-English will now be described with reference to the flow diagram of FIG. 24.

When the French-speaking participant 308 wishes to speak, they use their handset 308a to generate a request to speak. The request to speak is received at the computer 301 so as to be visible to the presenter 300 or a Chairman (step S91). When the presenter 300 stops speaking and wishes the French-speaking participant 308 to speak, the computer 301 is used to send a control signal to the French-speaking participant's handset 308a and to the English/French translator's handset 311 a (step S92). The English/French translator's handset 311 a switches from receiving on channel 1 and transmitting on channel 3 to receiving on channel 3 and transmitting on channel 1 (step S93). The French-speaking participant's handset 308a switches in response to the signal from the computer 301 to change the French channel 3 from a receive channel to a transmit channel. The French-speaking participant can thus speak into the microphone in the handset and this is transmitted over channel 3 to the English/French translator's handset 311a which receives on channel 3 enabling the English/French translator 311 to hear the French and translate it into English for transmission on the English channel 1. Thus the English translation is broadcast to the handset 303 for audio output to the loudspeaker 304 such that the English translation can be heard as the floor language. Also, the English/German translator 310 and the English/Spanish translator 312 still receive English and thus there is no need for them to change channels.

Thus, this system provides a simple way in which only the handsets used by the people involved in the language change need be modified. It does not require other translators to switch channels. Also the channel switching and microphone activation is performed automatically. The controller can allow one participant to speak at a time and the system automatically determines the language (or channel) used by the speaker to determine how to control the switching. The identification can be done by looking up in a database based on the unique ID of the handset. In the database the handset users language can be entered along with the ID of the handset that they are using. Alternatively when a participant sets up their handset, they can enter their spoken language of choice. This can be stored in the handset and sent to the controller i.e. computer or master handset when the user requests to speak. The controller can thus determine how to switch the communication channels of the participant's handset and the translator's handset.

When the participant has finished speaking, the process is reversed to enable the participant to listen in French to a translation either from the presenter speaking in English or from another participant that the presenter has allowed to speak. For example, if the German-speaking participant 306 is allowed to speak, the associated handset 306a will be switched from receiving on the German channel 2 to transmitting on the German channel 2. Also, the English/German translator 310 will have their handset 310a switched from receiving on English channel 1 and transmitting on German channel 2 to receiving on German channel 2 and transmitting on English channel 1. The English/French translator 311 will then be receiving the German-to-English translation on English channel 1 and will thus generate a French translate on French channel 3 for transmission to the French-speaking participant to listen to. Thus the German-to-French translation goes through the intermediate of an English translation. This reduces the number of translations needed and simplifies the system. All translations go through the floor language of the conference, which in this case is English.

A method of configuring a handset in a participant response system in dependence upon the identity of a participant or a group to which the participant belongs will now be described.

At the beginning of an event a participant can be provided with a handset which is generically configured or not configured at all. In order to activate the handset a user can be required to enter information identifying themselves or a group to which they belong. Information can be entered either by a smart card or using the keyboard. The information to be entered can either be a simple user ID which matches a user ID stored in the controlling computer or master handset in which there are stored further details about the user. This is applicable, for example, for an event for which there is pre-registration where a user will supply details before the event and this will be entered into the computer or master handset and the user can be provided with an ID. Thus when the participant enters the ID into the handset this is transmitted to the central controller, i.e. the computer or the handset and full information is available. Alternatively, the information entered contains full information on the user, and this can be transmitted to the computer or the master handset and stored. For security, a user may also be required to enter a PIN number to activate the handset. The PIN number can be transmitted together with the user information or user ID to the computer or master handset. Alternatively the PIN number can be checked in the handset by running an algorithm.

At the computer or master handset, user information is used to generate configuration data for the handset. The configuration data can be generated using a set of rules based on the user input information. The configuration data can also be generated based on a set of configuration instances defining different levels of functionality available to the participant. For example, a presenter, a Chairman, an organizer, and a delegate can each be given different levels of functionality. Identification of whether the participant is a presenter, a Chairman, an organizer, or a delegate can either be determined from the information input by the participant, or from the information stored in conjunction with the participant ID in the computer or master handset. The generated configuration data can then be transmitted back to the handset to configure the handset in accordance with the level of functionality determined to be allowed to the participant.

Thus this embodiment of the present invention has the advantage of enabling configuration instances to be stored centrally and thus to be controllably modified as and when appropriate. For example, a configuration instance applicable to a Chairman or a delegate can be modified centrally so that any delegates registering for the activation of the handset will automatically be given the same configuration data, i.e. the same level of functionality. This provides a simple method of upgrading configuration parameters and capabilities of handsets.

In an alternative embodiment of the present invention, handsets can be configured using smart cards. Smart cards can store the configuration data used for configuring the handset. This method requires different types of smart cards to be made available to participants. Also, the updating of configuration instances requires the updating of each and every smart card.

A method of operating the participant response system for providing participant position information will now be described.

At the beginning of an event or during the event when a participant moves, it is possible for the participant to enter their location, e.g. their seat number. This information is transmitted together with a unique ID for the handset to the controller, i.e. the computer or the master handset. This enables position information to be stored identifying the location of the handsets during the event. Thus when responses are input using a handset, it is possible a user of the controller to determine the location from which responses were made. This can be visualized as a map indicating the location of the handsets. Where a participant is uniquely associated with a handset and has entered participant identification information, it is possible for the controller to store information identifying the location of participants during the event. This can be visualized as a map of participant locations.

This system has the benefit of enabling participants to choose their location rather than being required to stay in a predetermined location. In other words, delegates at a conference to choose their own seat. Alternatively, a delegate can be pre-assigned a seat but can still enter their location information at the time of taking their seat.

Thus, the information available to the event organizers on the location of the participants is correct and dynamically updateable.

The use of position information is particularly useful in an event where participants are allowed to speak using the audio capability of the handset. When a participant is allowed to speak, a controller can control a slave handset connected to a camera control system in order to generate position information for transmission to the camera control system. The camera control system can then pan the camera onto the speaker to generate a picture of the speaker which can be displayed to the other conference participants. Thus not only in this system is the conference participant able to speak and be heard over the wireless PA system as described for example with reference to FIG. 23, but also the conference participant is automatically displayed so as to be visible to the other conference participants. Thus, the participant wishing to speak can be both seen and heard by all participants. Also, if the identity of the participant id known due to registration of the participant to associate a participant to a handset unique ID in a central database, the image of the participant can include the name of the participant and other information on the participant as a subtitle or displayed otherwise.

A method of providing a business method for sale of participant response systems will now be described.

A business method of one aspect of the present invention comprises selling a participant response system comprising a plurality of configurable and upgradeable handsets which have a higher level of functionality available to them than currently enabled. The system can be sold at low cost due to the limited functionality. Where a customer wishes to, at a later date, purchase a higher level of functionality, instead of replacing the handsets, it is simply necessary to reconfigure the handsets to enable certain disabled functions. This can be achieved either using a smart card or a radio frequency control communication. For example, the mode type functionality which is set in BIOS can be permanently upgraded by downloading a new BIOS. The modes enabled and disabled can also be modified by modifying the configuration data. The configuration data defines the mode type in which the handset is set.

Thus this business method enables a fully capable participant response system to be sold initially with a view to selling functionality upgrades to the customer at a later date without requiring upgrading of the hardware. This is simply achieved without requiring the hardware to be returned to the manufacturer by providing smart cards, for insertion in the handsets, or software for configuring the controlling computer to control a base station to download new configuration data to upgrade the functionality of the handsets.

Although the present invention has been described hereinabove with reference to specific embodiments, it will be apparent to a skilled person in the art that modifications lie within the spirit and scope of the present invention.

An important feature of an aspect of the present invention is that the participant response system implements an event driven network. The network is not based on a base station polling handsets. The spread spectrum communication system enables the event driven network by allowing the handsets and the base station to communicate with one another when necessary. It also enables the handset and the controller to monitor the communication status. This therefore enables the system to be more responsive.

Another important feature of an aspect of the present invention is the interchangeability, and reconfigurability of the handsets thereby providing redundancy in the system. Any handset can be configured as a base station or a master handset. Thus if there is a failure of a handset acting as a base station, another handset can be configured as a base station. Another advantage for a customer that has a number of handsets is that he can use them all together as one network or split them up into small systems to suit his needs as they change The network thus acts as a peer-to-peer network.

In another embodiment of the present invention, the handset need not be restricted to use by a single participant. Participants can configure a handset by entering user information e.g. using a smart card. The central database will thus store more than one set of user information for a handset unique ID. Participants can thus enter their user information before entering a response so that the response can be associated with them uniquely.

What is claimed is:

1. A method of configuring a handset for use in a participant response system allowing a participant of an event to input a response, the method comprising:
    entering participant information identifying a group of participants to which the participant belongs into the handset;
    transmitting the entered information and information uniquely identifying the handset over a wireless link to a central unit;
    at the central unit, determining handset configuration parameters for the handset on the basis of said entered information;
    transmitting the determined handset configuration parameters to the handset;
    configuring the handset in accordance with the determined handset configuration parameters, and
    repeating the entering, the transmitting of the entered information, the determining, the transmitting of the determined handset configuration parameters, and the configuring for each of a plurality of groups of handsets,
    wherein the step of configuring includes altering data in the handset so as to alter the operation of the handset to allow communication between each handset of a group without interfering with communications between handsets of another group.

2. A method according to claim 1, wherein said entered information includes information identifying the level of functionality of the handset available to the participant.

3. A method according to claim 1, wherein said central unit stores functionality information linking the level of functionality of the handset with the entered information, and said handset configuration parameters are determined additionally on the basis of said functionality information.

4. A participant response system for allowing a participant of an event to input a response, the system comprising:
    a plurality of groups of handsets, each handset including:
        an input device for entering participant information identifying a group of participants to which the participant belongs;
        a transmitter for transmitting the entered information and information uniquely identifying the handset over a wireless link to a central unit;
        handset program memory storing program code; and
        a processor for implementing the program code in the handset memory; and
    a central unit including:
        a receiver for receiving the entered information;
        a processor programmed to determine handset configuration parameters for the handset on the basis of said entered information; and
        a transmitter for transmitting the determined handset configuration parameters to the handset,
    wherein said program code in said handset program memory includes code for implementing by said processor to configure the handset in accordance with the determined handset configuration parameters to allow communication between each handset of a group without interfering with communications between handsets of another group.

5. A participant response system according to claim 4, wherein said entered information includes information identifying the level of functionality of the handset available to the participant.

6. A participant response system according to claim 4, wherein said central unit includes a memory for storing functionality information linking the level of functionality of the handset with the entered information, and wherein said processor determines the handset configuration parameters additionally on the basis of said functionality information.

7. A participant response system for allowing a participant of an event to input a response, the system comprising:
    a plurality of independent communicating groups, each group comprising:
        a plurality of groups of wireless handsets, wherein each handset comprises an input for receiving participant information identifying the group of wireless handsets to which the handset belongs; a memory storing a group identity identifying the group to which the handset belongs out of a plurality of possible groups, an input device for allowing a participant to input a response in response to the event, and a transmitter for transmitting the response; and
        a plurality of base stations for communicating with the plurality of handsets in the groups, and controlling the participant response system, each base station comprising a memory storing a group identity identifying a group to which the base station belongs and a transmitter for receiving the responses from handsets in the group,
    wherein each handset includes program memory storing program code and a configuration processor for implementing the program code, the program code including code to set up the group identity of the handset dependent upon the group identity of a said base station, and wherein a plurality of said handsets and at least one said base station form a group and each handset includes code to bi-directionally communicate independently of and without interference with communications of other groups by comparison of the group identity stored for the handsets and said at least one base station, and wherein each handset of a group only bi-directionally communicates with said at least one base station of the same group.

8. A participant response system according to claim 7, wherein each base station comprises a handset configured to act as a base station, each said handset being configurable as a handset for use by a participant or as a base station.

9. A participant response system according to claim 7, including a response processor for processing responses from participants, said response processor being connected in use to each base station to receive the responses.

10. A participant response system according to claim 9, wherein said responses are made by the participants in response to a common stimulus, and said response processor is adapted to process the responses together.

11. A participant response system according to claim 10, wherein said responses are made by the participants in response to a stimulus different for each communication group, and wherein said response processor is adapted to process the responses separately.

12. A participant response system according to claim 11, wherein said event is divided into sub events, and each communicating group is associated with a sub event.

* * * * *